United States Patent

Harui et al.

[11] Patent Number: 6,103,788
[45] Date of Patent: *Aug. 15, 2000

[54] CURABLE RESIN COMPOSITION FOR USE IN WATER-BASED COATING MATERIALS

[75] Inventors: Nobuo Harui, Ichihara; Akifumi Yamamoto, Izumiotsu; Hidehisa Nakamura, Kishiwada, all of Japan

[73] Assignee: Dainippon Ink and Chemicals, Inc., Tokyo, Japan

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/875,297

[22] PCT Filed: Nov. 28, 1996

[86] PCT No.: PCT/JP96/03476

§ 371 Date: Jul. 22, 1997

§ 102(e) Date: Jul. 22, 1997

[87] PCT Pub. No.: WO97/20004

PCT Pub. Date: May 6, 1997

[30] Foreign Application Priority Data

Nov. 28, 1995 [JP] Japan ................................ 7-309013
Jan. 19, 1996 [JP] Japan ................................ 8-007422

[51] Int. Cl.$^7$ .................................................. C08K 5/1515
[52] U.S. Cl. ........................ 523/403; 523/400; 523/408; 523/409; 523/410; 523/411; 523/412; 523/427; 523/433; 523/434; 523/435; 523/437; 523/456; 524/114; 524/263; 524/265; 524/266; 524/517; 524/520; 524/521; 524/531; 524/533; 524/535; 524/268; 524/269
[58] Field of Search ........................ 524/114, 263, 524/265, 268, 266, 520, 521, 269, 517, 812, 531, 533, 535; 523/408, 410, 411, 400, 435, 437, 456, 409, 412, 403, 427, 433, 434

[56] References Cited

U.S. PATENT DOCUMENTS

| 4,077,932 | 3/1978 | Columbus ................................ 524/114 |
| 4,590,230 | 5/1986 | Kamada et al. ......................... 524/265 |
| 4,818,790 | 4/1989 | Ooka et al. ............................. 525/103 |
| 5,376,704 | 12/1994 | Barsotti .................................. 523/414 |
| 5,399,601 | 3/1995 | Kusumi et al. ......................... 524/265 |

FOREIGN PATENT DOCUMENTS

| 0 173 278 | 3/1986 | European Pat. Off. . |
| 195 29 659 A1 | 3/1996 | Germany . |
| 61-28543 | 2/1986 | Japan . |
| 61-60748 | 3/1986 | Japan . |
| 8-104846 | 4/1996 | Japan . |

Primary Examiner—Judy M. Reddick
Attorney, Agent, or Firm—Armstrong, Westerman, Hattori, McLeland & Naughton

[57] ABSTRACT

The present invention relates to a curable resin composition for use in water-based coating materials which includes as essential components an emulsion polymer (A) containing tertiary amino groups obtained by carrying out emulsion polymerization of a vinyl monomer containing a tertiary amino group with another copolymerizable vinyl monomer in a water-based medium, and a compound (B) containing, at least, an epoxy group and a hydrolyzable silyl group, with this composition preferably also including a water-based compound (C) obtained by adding a neutralizing agent to a vinyl polymer (I) containing acidic groups and/or tertiary amino groups so as to neutralize at least 10% of the acidic groups and/or the tertiary amino groups, and then dispersing or dissolving in water, and/or a compound (D), which is not included in compound (B), and contains hydrolyzable silyl group and/or a silanol group. The coating material provided by the composition of the present invention is curable at ambient temperatures and demonstrates excellent coating properties. Moreover, the cured coating obtained from the composition of the present invention offers superior resistance to weathering, solvents, chemicals and water, and is not problematic with respect to conservation of the environment.

16 Claims, No Drawings

CURABLE RESIN COMPOSITION FOR USE IN WATER-BASED COATING MATERIALS

TECHNICAL FIELD

The present invention relates to a novel and useful curable resin composition for use in water-based coating materials, and more specifically, to a curable resin composition for use in a water-based composition which includes as coat-forming components at least an emulsion polymer containing a specific tertiary amino group and a compound having an epoxy group and a hydrolyzable silyl group. This curable resin composition for use in water-based coating materials is not only superior with respect to its workability and curing properties, but also provides a cured coating with excellent resistance to weathering, solvents, chemicals, and water. Accordingly, this composition is particularly useful when applied in coating materials.

BACKGROUND ART

Fueled by such demands worldwide as protection of the environment and an improvement in workplace conditions in recent years, it has become necessary to move away from conventional coating materials containing organic solvents, to coating materials which release little organic solvent into the atmosphere. In addition, from the perspective of energy conservation, as well, the development of a type of coating resin which form crosslinking at ordinary temperature has been particularly attractive.

A composition of a water-based emulsion composition consisting of a copolymer composed of an unsaturated monomer of the ethylene family and an aminoalkyl(meth)acrylate having a primary or secondary amino group, and a epoxy silane coupling agent has been proposed heretofore (Japanese Patent Application, First Publication No. Sho 61-28543). However, the cured coating obtained from this composition has been problematic in that it tends to be inferior with respect to its weather resistant properties and the like.

Accordingly, the present inventors began extensive research aimed at developing a composition which would resolve the aforementioned problems encountered in the conventional art, while also meeting the various demands of the coating industry as described above.

Therefore, the present invention has as an objective for the provision of a curable resin composition for use in water-based coating materials which is novel and has an extremely high degree of utility, the composition having excellent workability and curing properties, while containing little or no organic solvent as compared to conventional organic solvent-based coatings, and moreover, offering a cured coating which is superior with respect to resistance to weathering, solvents, chemicals and water.

Additionally, in view of energy conservation, it is also an objective of the present invention to provide a novel curable resin composition for use in water-based coating materials with a high degree of utility, which can form crosslinking at ordinary temperature.

DISCLOSURE OF INVENTION

As a result of exhaustive research to resolve the above-described problems, the present inventors completed the present invention upon the discovery that a composition comprising an emulsion polymer (A) containing tertiary amino groups which is obtained by carrying out emulsion polymerization of a vinyl monomer containing a tertiary amino group and another copolymerizable vinyl monomer in a water-based medium, and a compound (B) containing, at least, an epoxy group and a hydrolyzable silyl group, has superior coating properties and provides a cured coating with excellent resistance to weathering, yellowing from heat, solvents, chemicals, dirt shedding, and water, while enabling a reduction in the amount of organic solvent contained therein.

Accordingly, the first objective of the present invention is the provision of a curable resin composition for use in water-based coating materials, characterized in including an emulsion polymer (A) containing tertiary amino groups which is obtained by carrying out emulsion polymerization of a vinyl monomer containing a tertiary amino group and another copolymerizable vinyl monomer in a water-based medium, and a compound (B) containing, at least, an epoxy group and a hydrolyzable silyl group.

Another objective of the present invention is the provision of a curable resin composition for use in water-based coating materials, characterized in including an emulsion polymer (A) containing tertiary amino groups which is obtained by carrying out emulsion polymerization of a vinyl monomer containing a tertiary amino group and another copolymerizable vinyl monomer in a water-based medium; a water-based compound (C) which is obtained by adding a neutralizing agent to a vinyl polymer (I) containing acidic groups and/or tertiary amino groups, so as to neutralize at least 10% of the aforementioned acidic groups and/or tertiary amino groups, and then dispersing or dissolving in water; and a compound (B) containing, at least, an epoxy group and a hydrolyzable silyl group.

Another objective of the present invention is the provision of a curable resin composition for use in water-based coating materials, characterized in including an emulsion polymer (A) containing tertiary amino groups which is obtained by carrying out emulsion polymerization of a vinyl monomer containing a tertiary amino group and another copolymerizable vinyl monomer in a water-based medium; a compound (B) containing, at least, an epoxy group and a hydrolyzable silyl group; and a compound (D), which is not included in compound (B), and contains a hydrolyzable silyl group and/or silanol group.

Another objective of the present invention is the provision of a curable resin composition for use in water-based coating materials, characterized in including an emulsion polymer (A) containing tertiary amino groups which is obtained by emulsion polymerizing a vinyl monomer containing a tertiary amino group and another copolymerizable vinyl monomer in a water-based medium; a water-based compound (C) which is obtained by adding a neutralizing agent to a vinyl polymer (I) containing acidic groups and/or tertiary amino groups, so as to neutralize at least 10% of the aforementioned acidic groups and/or tertiary amino groups, and then dispersing or dissolving in water; a compound (B) containing, at least, an epoxy group and a hydrolyzable silyl group; and a compound (D), which is different from compound (B), and contains a hydrolyzable silyl group and/or silanol group.

In the curable resin composition for use in a water-based coating material according to the present invention, it is preferable that emulsion polymer (A) containing tertiary amino groups also have a carboxyl group.

Additionally, it is preferable that emulsion polymer (A) containing tertiary amino groups be prepared using at least a vinyl monomer containing a hydroxyl group as the monomer component.

It is also preferable that emulsion polymer (A) containing tertiary amino groups be prepared using at least a vinyl monomer containing a cycloalkyl group as the monomer component.

It is also preferable that emulsion polymer (A) containing tertiary amino groups be prepared using a soap-free polymerization method.

It is also preferable that emulsion polymer (A) containing tertiary amino groups be neutralized with an acidic compound, so that the ratio of the equivalent weight of the acidic compound with respect to that of the tertiary amino groups included in emulsion polymer (A) be 0.1 or more.

It is also preferable that emulsion polymer (A) containing tertiary amino groups be neutralized with a basic compound, so that the ratio of the equivalent weight of the basic groups in the basic compound with respect to that of the acidic groups included in emulsion polymer (A) be 0.1 or more.

It is also preferable that emulsion polymer (A) containing tertiary amino groups be an acrylic polymer.

In the curable resin composition for use in water-based coating materials according to the present invention, it is preferable that the vinyl polymer (I) containing acidic groups and/or tertiary amino groups be prepared using at least a vinyl monomer containing a hydroxyl group as a starting component.

It is also preferable that the vinyl polymer (I) containing acidic groups and/or tertiary amino groups be prepared using at least a vinyl monomer containing a cycloalkyl group as a starting component.

It is also preferable that the vinyl polymer (I) containing acidic groups and/or tertiary amino groups be a combination of an acrylic polymer and a fluoro olefin polymer.

It is also preferable that the vinyl polymer (I) containing acidic groups and/or tertiary amino groups be either an acrylic polymer or a fluoro olefin polymer.

The present invention's curable resin composition for use in water-based coating materials fundamentally contains an emulsion polymer (A) containing tertiary amino groups which is obtained by carrying out emulsion polymerization of a vinyl monomer containing a tertiary amino group and another copolymerizable vinyl monomer in a water-based medium; and a compound (B) containing, at least, an epoxy group and a hydrolyzable silyl group.

In general, when compound (B) containing, at least, an epoxy group and a hydrolyzable silyl group is mixed with an emulsion polymer, the hydrolyzable silyl groups in compound (B) undergo hydrolysis over a short period of time, followed by a condensation reaction, leading to consumption of the hydrolyzable silyl groups, or consumption of the epoxy groups in compound (B) by a ring opening reaction with water. Accordingly, it was anticipated that this mixture would show inferior curing, and give rise to a coating having a number of inferior properties.

It thus came as a surprise to discover that the present invention's curable resin composition for use in water-based coating materials containing as the emulsion polymer, a emulsion polymer (A) containing tertiary amino groups obtained by carrying out emulsion polymerization of a vinyl monomer containing a tertiary amino group and another copolymerizable vinyl monomer in a water-based medium, has excellent curing properties despite the inclusion of compound (B). Moreover, even though the curable resin composition for use in water-based coating materials according to the present invention includes little or no organic solvent as compared to conventional organic solvent-type compositions, it provides a coating of remarkably superior properties.

In addition, it was found that the combination of emulsion polymer (A), water-based compound (C) which is obtained by adding a neutralizing agent to a vinyl polymer (I) containing acidic groups and/or tertiary amino groups, so as to neutralize at least 10% of the aforementioned acidic groups and/or tertiary amino groups, and then dispersing or dissolving in water, and compound (B), in the present invention's curable resin composition for use in water-based coating materials not only provides a coating having excellent properties and capabilities, but also realizes improved flow characteristics so that coat formation is improved. Moreover, this combination also results in improved smoothness, leading to a better gloss of film surface, and reduces sagging, which can become a problem when applying to vertical surfaces. In addition, it is also possible to control orientation of aluminum in the case of a metallic coating which is obtained by adding aluminum paste. Thus, the coating operation is markedly improved, while the finished appearance of the coating is excellent.

In addition, it was understood that a curable resin composition for use in water-based coating materials according to the present invention which includes emulsion polymer (A), compound (B) containing, at least, an epoxy group and a hydrolyzable silyl group, and, additionally, a compound (D), which is not including in compound (B), and contains a hydrolyzable silyl group and/or silanol group, provides a cured coating with excellent resistance to weathering, solvents, chemicals, dirt shedding, and water.

Further, it was found that a curable resin composition for use in water-based coating materials according to the present invention which includes emulsion polymer (A), compound (B), water-based compound (C), and compound (D), has excellent curability, and superior coating properties despite the inclusion of little or no organic solvent, as well as improved flow characteristics and ease of coating operation. Moreover, the coating obtained from this composition demonstrates an improved finished appearance, and superior resistance to weathering, solvents, chemicals, staining, and water. Accordingly, this coating composition has an extremely high degree of utility.

BEST MODE FOR CARRYING OUT THE INVENTION

Accordingly, one preferred embodiment of the present invention is a curable resin composition for use in water-based coating materials which includes an emulsion polymer (A) containing tertiary amino groups which is obtained by carrying out emulsion polymerization of a vinyl monomer containing a tertiary amino group and another copolymerizable vinyl monomer in a water-based medium; a water-based compound (C) which is obtained by adding a neutralizing agent to a vinyl polymer (I) containing acidic groups and/or tertiary amino groups, so as to neutralize at least 10% of the aforementioned acidic groups and/or amino groups, and then dispersing or dissolving in water; a compound (B) containing, at least, an epoxy group and a hydrolyzable silyl group; and a compound (D), which is not including compound (B), and contains a hydrolyzable silyl group and/or silanol group.

In addition to a curable resin composition for use in water-based coating materials according to the present invention which includes emulsion polymer (A), compound (B), water-based compound (C), and compound (D), all other variations of the present invention are of course novel and of sufficient utility, provided that they contain at least emulsion polymer (A) and compound (B) as essential components.

The present invention's curable resin composition for use in water-based coating materials contains as an essential coat-forming component emulsion polymer (A) containing a tertiary amino group which is obtained by carrying out emulsion polymerization of a vinyl monomer containing a tertiary amino group and another copolymerizable vinylmonomerin a water-based medium. As examples of emulsion polymer (A), various so-called vinyl polymers may be mentioned, including acrylic polymers, aromatic vinyl polymers, vinyl ester polymers and the like. Of these, acrylic emulsion polymers are preferred in particular.

Particularly suitable examples of the tertiary amino vinyl monomer (hereinafter abbreviated as (a-1)) used when prepared emulsion polymer (A) include the various (meth) acrylic acid ester monomers such as 2-dimethylaminoethyl (meth)acrylate, 2-diethylaminoethyl(meth)acrylate, 3-dimethylaminopropyl (meth)acrylate, 3-diethylaminopropyl (meth)acrylate, 3-dimethylaminopropyl acrylamide, N-(2-(meth) acryloyloxyethyl)piperidine, N-(2-(meth)acryloyloxyethyl) pyrrolidine and N-(2-(meth)acryloyloxyethyl)morpholine; the various aromatic monomers such as 4-(N,N-dimethylamino)styrene, 4-(N,N-diethylamino)styrene and 4-vinylpyridine; the various vinyl ethers having a tertiary amino group such as 2-dimethylaminoethylvinylether, 2-diethylaminoethylvinylether, 4-dimethylaminobutylvinylether, 4-diethylaminobutylvinylether and 6-dimethylaminohexylvinylether.

Particularly representative examples of the other vinyl monomer (hereafter ahbreviated as (a-2) ) to he copolymerized with the tertiary amino vinyl monomer (a-1) mentioned above include the various polymerizable monomers such as alkyl(meth)acrylates, alkyl crotonates, dialkylesters of unsaturated dibasic acids, monocarboxylic acid vinyl esters, and aromatic vinyl monomers; various monomers having one or more halogen atoms, such as a fluorine or chlorine, per molecule; various monomers having a non-functional silicon atom such as monomers having polysiloxane bonds; various monomers having polyether chains; various monomers having a functional group such as an amide, cyano, hydroxyl, acidic group, neutralized acidic group, epoxy or hydrolyzable silyl group; various monomers having poly (oxyethylene) chains; polyfunctional vinyl monomers having two or more polymerizable double bonds per molecule; and the like.

Of these, representative examples of polymerizable monomers include various (meth)acrylic acid esters such as methyl (meth)acrylate, ethyl (meth)acrylate, n-propyl (meth)acrylate, isopropyl (meth)acrylate, n-butyl (meth) acrylate, isobutyl (meth)acrylate, tert-butyl (meth)acrylate, 2-ethylhexyl (meth)acrylate, lauryl (meth)acrylate, cyclopentyl (meth)acrylate, cyclohexyl (meth)acrylate, benzyl (meth)acrylate, and the like; various ester crotonates such as methyl crotonate, ethyl crotonate, and n-butyl crotonate; the various unsaturated diacidic dialkyl esters such as dimethylmaleate, dimethylfumarate, dibutylfumarate and dimethylitaconate; the various monocarboxyl vinyl esters such as vinylacetate, cyclohexane vinyl carboxylate, vinylbenzoate, and "VEOVA", (a branched chain mono carboxyl vinyl ester produced by Shell Corporation, Holland); various aromatic vinyl monomers such as styrene, α-methyl styrene, p-tert-butyl styrene, and vinyl toluene; and the like.

From among vinyl monomers (a-2), representative examples of monomers having one or more halogen atoms, such as fluorine or chlorine, per molecule include such (per)fluoroalkyl vinyl monomers as fluoroalkyl (meth) acrylates, perfluoroalkyl (meth)acrylates, perfluorocyclohexyl (meth)acrylate, di-perfluorocyclohexyl fumarate, and N-isopropyl perfluorooctane sulfonamide ethyl (meth) acrylate; and various chlorinated olefins such as vinyl chloride and vinylidene chloride.

From among vinyl monomer (a-2), representative examples of monomers having a non-functional silicon atom include the various monomers represented by the general prepared: $CH_2=CHCOO(CH_2)_3[Si(CH_3)_2O]_nSi(CH_3)_3$, $CH_2=C(CH_3)COOC_6H_4[Si(CH_3)_2O]_nSi(CH_3)_3$, $CH_2=C(CH_3)COO(CH_2)_3[Si(CH_3)_2O]_nSi(CH_3)_3$, $CH_2=C(CH_3)COO(CH_2)_3[Si(CH_3)(C_6H_5)O]_nSi(CH_3)_3$, and $CH_2=C(CH_3)COO(CH_2)_3[Si(C_6H_5)_2O]_nSi(CH_3)_3$, (where n is 0, or an integer from 1~130).

From among vinyl monomers (a-2), representative examples of monomers having a polyether chain include monomers having a polyether segment such as polyethylene glycol (meth)acrylate, polypropylene glycol (meth)acrylate, and the like. In particular, these may be used within limits which do not impair resistance to weathering and water.

From among vinyl monomers (a-2), representative examples of monomers having an amide group include various vinyl monomers containing a carboxylic acid amide group such as N,N-dimethyl (meth)acrylamide, N-alkoxymethyl (meth)acrylamides, diacetone (meth) acrylamide, and N-methylol (meth)acrylamide.

From among the vinyl monomers (a-2), representative examples of the monomers having a cyano group include acrylonitrile, methacrylonitrile, crotononitrile and the like.

From among the vinyl monomers (a-2), representative examples of monomers having a hydroxyl group include the various hydroxyalkyl (meth)acrylates such as 2-hyroxyethyl (meth)acrylate, 2-hyroxypropyl (meth)acrylate, 2-hyroxybutyl (meth)acrylate, and 4-hyroxybutyl (meth) acrylate; and addition products such as hydroxyalkyl (meth) acrylates and ε-caprolactone.

From among the various vinyl monomers (a-2), representative examples of monomers having an acidic group include various unsaturated monobasic acids such as acrylic acid, (meth)acrylic acid and crotonic acid; various unsaturated dibasic acids such as maleic acid, fumaric acid, itaconic acid, and citraconic acid; half esters of the aforementioned unsaturated dibasic acids like maleic acid, fumaric acid and itaconic acid, and alkyl alcohols containing between 1 and 10 carbon atoms; aromatic compounds having carboxyl groups like 4-vinylbenzoic acid, cinnamic acid and the like; the products of addition reactions between saturated dibasic acids and monomers having hydroxy groups such as succinic acid mono 2-(meth)acryloyloxyethyl ester and phthalic acid 2-(meth)acryloyloxyethyl ester; mono vinyl esters having polycarboxylic acids such as malonic acid, succinic acid, adipic acid and sebacic acid; vinyl monomers having a phospholic acid group such as mono [2-(meth) acryololoxyethyl] acid phosphate; various vinyl monomers containing sulfonic acid group such as vinylsulfonic acid, allylsulfonic acid, 2-methyl allylsulfonic acid, 4-vinylbenzenesulfonic acid, 2-(meth)acryloyl oxyethanesulfonic acid, 3-(meth)acryloyl oxypropanesulfonic acid, 2-acrylamido-2-methylpropanesulfonic acid, and the like.

From among the vinyl monomers (a-2), representative examples of monomers with a neutralized acidic group include various monomers having a salt form obtained by neutralizing a monomer having a carboxyl, sulfonic acid or phosphoric acid groups with a basic compound.

Representative examples of the basic compound employed when prepared a monomer having a neutralized acidic group include various inorganic basic compounds like lithium hydroxide, sodium hydroxide, potassium hydroxide, and ammonium hydroxide; as well as various organic basic compounds like ethylamine, n-butylamine, dimethylamine, diethylamine, trimethylamine, triethylamine, tri-n-butylamine, diethanolamine, 2-dimethylaminoethyl alcohol, tetramethylammonium hydroxide, and tetra-n-butylammonium hydroxide.

Representative examples of commercially available monomers having a neutralized acidic group include monomers having a neutralized sulfonic acid group such as "LATEMUL S-180" or "LATEMUL S-180A" (manufactured by Kao Corp.) and "ELEMINOL JS-2" or "ELEMINOL RS-30" (manufactured by Sanyo Chemical Industries, Ltd.); monomers having neutralized sulfuric acid group such as "AQUALON HS-10" (manufactured by Dai-ichi Kogyo Seiyaku Co., Ltd.), and "ADEKA REASOAP SE-10N" (manufactured by Asahi Denka Kogyo K.K.); and monomers having a phosphoric acid group such as "NEW FRONTIER A-229E" (manufactured by Dai-ichi Kogyo Seiyaku Co., Ltd.).

From among the vinyl monomers (a-2), representative examples of monomers having an epoxy group include glycidyl(meth)acrylate, (β-methyl)glycidyl(meth)acrylate, 3,4-epoxycyclohexyl(meth)acrylate, allyl glycidyl ether, 3,4-epoxyvinylcyclohexane, di(β-methyl)glycidyl maleate, or di(β-methyl)glycidyl fumarate.

In the case of vinyl monomers (a-2) having a hydrolyzable silyl group, the term "hydrolyzable silyl" group as used indicates a silyl group such as represented by the following general prepared, in which the functional group is readily hydrolyzable and produces a hydroxy group bonded to a silicon atom upon hydrolysis.

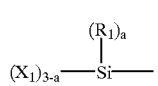

(1)

(Wherein, $R_1$ indicates a monovalent hydrocarbon group selected from the group comprising alkyls, aryls, and aralkyls of 1 to 10 carbons; $X_1$ indicates a monovalent group selected from the group comprising a halogen atom, hydroxy group, alkoxy group, acyloxy, aminoxy, phenoxy, thioalkoxy, or amino group; and a indicates 0, 1 or 2.)

Representative examples of vinyl monomers having a hydrolyzable silyl group include γ-(meth)acryloyloxypropyl trimethoxysilane, γ-(meth) acryloyloxypropyltriethoxysilane, γ-(meth) acryloyloxypropylmethyldimethoxysilane, γ-(meth) acryloyloxypropylmethyldiethoxysilane, γ-(meth) acryloyloxypropyltriisopropenyloxysilane, vinyltrimethoxysilane, vinyltriethoxysilane, vinyl (tris-β-methoxyethoxy)silane, vinyltriacetoxysilane, vinyltrichlorosilane, and N-β-(N-vinylbenzylaminoethyl)-γ-aminopropyltrimethoxysilane, as well as hydrochlorides of these.

From among vinyl monomers (a-2), representative examples of monomers having a functional group other than those cited above, include monomers having a variety of functional groups, i.e., silyl esters of monomers having a carboxyl group, such as trimethylsilyl(meth)acrylate and tert-butyldimethylsilyl (meth) acrylate; monomers having an acetal ester group obtained by reacting an α,β-unsaturated ether compound and a monomer having a carboxyl group such as 1-ethoxyethyl (meth)acrylate or 1-isobutoxyethyl (meth)acrylate; silyl ethers such as 2-trimethylsiloxyethyl (meth)acrylate, and 2-dimethyl-tert-butyl siloxyethyl (meth) acrylate; monomers with an epoxy group such as glycidyl (meth)acrylate, allylglycidyl ethers, and the like; monomers having aziridinyl group such as 2-aziridinylethyl (meth) acrylate; monomers having an isocyanate group like isocyanate ethyl (meth)acrylate, and (meth)acryloyl isocyanate; monomers having a blocked isocyanate group prepared by reacting a monomer having an isocyanate group and a blocking agent; and monomers having a oxazoline group like 2-isopropenyl-2-oxazoline or 2-vinyl-2-oxazoline.

From among the vinyl monomers (a-2), representative examples of monomers having a poly(oxyethylene) chain include polyethylene glycol mono(meth)acrylate, polypropylene glycol mono(meth) acrylate, polytetramethylene glycol mono(meth)acrylate, monoalkoxypolyethylene glycol (meth)acrylate, monoalkoxypolypropylene glycol (meth) acrylate, and the like.

From among vinyl monomers (a-2), representative examples of multifunctional vinyl monomers having two or more polymerizable double bonds per molecule include ethylene glycol di(meth)acrylate, 1,6-hexane diol di(meth) acrylate, neopentyl glycol di(meth)acrylate, trimethylolpropane tri(meth)acrylate, polyethylene glycol di(meth) acrylate, polypropylene glycol di(meth)acrylate, allyl(meth) acrylate, diallyl phtalate, divinylbenzene, and the like.

The amount of the employed vinyl monomer (a-1) containing a tertiary amino group, which is one of the monomers cited above, is such that the amount of introduced tertiary amino group is between about 0.03 and 2.5 moles per 1,000 grams of solid content of emulsion polymer (A) containing tertiary amino groups, with between 0.05 and 1.5 moles being preferable, and between 0.05 and 0.5 moles being even more suitable.

When the amount of the employed vinyl monomer (a-1) containing a tertiary amino group is less than 0.03 moles, then the curing of the coating tends to be insufficient. On the other hand, when the amount employed exceeds 2.5 moles, then the coating tends to display insufficient resistance to chemicals, and the like.

It was found that when an acidic group is introduced into the emulsion polymer (A) containing tertiary amino groups, by, for example, using a monomer containing an acidic group as one comonomer from among the other copolymerizable vinyl monomers (a-2), it is possible to significantly improve the stability of polymerization when prepared emulsion polymer (A).

Moreover, it was found that by introducing the aforementioned acidic group, it is possible to even further improve curability in the present invention's curable resin composition for use in water-based coating materials which includes emulsion polymer (A). Thus, a coating material which is even more superior with respect to resistance to solvents and yellowing due to heat, and which provides a coating of even greater hardness can be obtained. Carboxyl group is preferably employed as the acidic group which best coincides with this objective.

The amount of the aforementioned vinyl monomer containing an acidic group when the vinyl monomer containing an acidic group is copolymerized with at least a portion of vinyl monomer (a-2) is such that the amount of introduced carboxyl group is between about 0.05 and 3 moles per 1,000 grams of solid content of emulsion polymer (A), with between 0.01 and 2.0 moles being preferable, and between 0.01 and 0.7 moles being even more suitable.

It was found that when a hydroxyl group is introduced into emulsion polymer (A), by, for example, using a monomer containing a hydroxyl group as one comonomer from among the other copolymerizable vinyl monomers (a-2), it is possible to significantly improve the curability of the present invention's curable resin composition for use in water-based coating materials, providing a coating which has even better resistance to solvents, a higher degree of hardness and excellent film appearance.

When copolymerizing the aforementioned monomers having a hydroxyl group, the copolymerization proportion is such that the amount of introduced hydroxyl group is around 0.04 to 2 moles, and preferably 0.08 to 1.2 moles, per 1,000 grams of solid content of emulsion polymer (A).

Further, when a cycloalkyl group is introduced into emulsion polymer (A) as a copolymerizable vinyl monomer by employing various monomers having cycloalkyl groups, such as cyclohexyl(meth)acrylate, for example, it is possible to even further improve the resistance to weathering and water of the present invention's curable resin composition for use in water-based coating materials which includes emulsion polymer (A) Additionally, when a silane compound (C) such as those cited below is also employed, the coating obtained offers an extremely high degree of utility, having an even more superior film appearance and dirt shedding resistance.

When introducing a cycloalkyl group into emulsion polymer (A), the amount employed of the monomer having the cycloalkyl group is such that the introduced cycloalkyl group is in the range of 0.5 to 5 moles, and preferably 1.0 to 4.2 moles, per 1,000 grams of solid content of emulsion polymer (A).

In the case of the above-cited emulsion polymer (A) containing tertiary amino groups, which is an essential component of the present invention, the polymer may be one in which cross-links are formed in the emulsion particles, or one in which cross-links are not formed. However, if cross links are formed in the emulsion particles, then the cured coat's resistance to water, weathering and the like is even better.

Several methods may be employed to form cross links in the emulsion particles of emulsion polymer (A). Namely, various monomers with a hydrolyzable silyl group, such as those cited above, may also be employed as a component of the aforementioned vinyl monomer (a-2) ; monomers from among the aforementioned (a-2) components which react with tertiary amino groups in particular from among a monomer's functional groups may also be used; from among the above-cited components of vinyl monomer (a-2), and in particular, from among vinyl monomers having functional groups, two or more different kinds of monomers which have mutually reactive functional groups may also be employed; or a multifunctional monomer may also be employed from among the aforementioned vinyl monomers (a-2).

As one example of a method for crosslinking within emulsion particles, a monomer having hydrolyzable silyl groups may be employed as one of the components of vinyl monomer (a-2) to crosslink the emulsion particles in emulsion polymer (A), with the monomer having the hydrolyzable silyl groups employed in an quantity such that amount of hydrolyzable silyl group introduced is in the range of 1 to 400 millimoles, and preferably 2 to 20 millimoles, per 1,000 grams of solid content of emulsion polymer (A).

When preparing emulsion polymer (A) by carrying out emulsion polymerization of a monomer mixture having the various above-cited tertiary amino vinyl monomers as the essential monomer component, in an aqueous medium, it is acceptable to employ one of the various conventional emulsifying-polymerizing methods.

Namely, a polymerization reaction can be carried out according to various conventional methods using anionic emulsifying agent or nonionic emulsifying agent, various known non-reactive emulsifying agent or reactive emulsifying agent, or conventional dispersion stabilizers.

Representative examples of anionic emulsifying agent employed in this case include sulfuric esters of higher alcohols, alkyl benzene sulfonate, poly(oxyethylene) alkylphenyl sulfonate, and the like. These may be used alone or in combinations of two or more.

Representative examples of non-ionic emulsifying agent include poly(oxyethylene)alkyl ether, poly(oxyethylene) alkylphenyl ether, poly(oxyethylene)-poly(oxypropylene) block copolymer and the like. Naturally, these may be used alone or in combinations of two or more.

Representative examples of the above reactive emulsifying agent include a variety of monomers in salt forms, such as sulfonate, sulfate or phosphate, such as cited above as examples of the monomer (a-2) which is copolymerizable with, but different from, the variety of monomers (a-1) having a tertiary amino group.

Representative examples of dispersion stabilizers include synthetic and natural water-based macromolecules such as polyvinyl alcohol, cellulose ether, starch, maleinized polybutadiene, maleinized alkyd resins, polyacrylic acid (salt), polyacryl amide, water-soluble acrylic resins and the like. These maybe used alone, or in combinations of two or more.

From the perspective of obtaining a cured coating from the present invention's curable resin composition for use in water-based coating materials which has particularly good resistance to water and the like, the amount of emulsifying agent used when prepared emulsion polymer (A) using carrying out emulsion polymerization method employing an emulsifying agent or dispersion stabilizer, is 10% by weight or less, and preferably 6% by weight or less, with respect to the solid content in emulsion polymer (A).

Moreover, methods in which polymerization is carried out using very little or no emulsifying agent or the so-called "soap-free" polymerization method, are particularly preferred because of the even further improvement realized in the water resistance of the cured coating obtained from the composition according to the present invention.

Various soap-free polymerization methods are available, including 1) a method in which polymerization is carried out primarily employing the reactive emulsifying agent mentioned above as an emulsifying agent; 2) a method in which polymerization is carried out in the presence of a water soluble acrylic resin from among the aforementioned various stabilizers in particular; 3) a method in which polymerization is carried out using an aforementioned reactive emulsifying agent and a water soluble acrylic resin; as well as other methods. From among these, method 2 or method 3 which employ a water soluble acrylic resin are particularly preferred.

The amount of emulsifying agent employed when carrying out soap-free polymerization is less than 2% by weight, and preferably 1% by weight or less, with respect to the solid content in emulsion polymer (A).

The amount of dispersion stabilizer employed is within the range of about 5 to 70% by weight, and preferably 10 to 50% by weight, with respect to the solid content of emulsion polymer (A). When the amount of dispersion stabilizer employed is less than 5% or so, polymerization stability deteriorates. Further, when the amount employed exceeds the aforementioned range, there is a marked increase in the viscosity of the resin, causing deterioration in the coating properties.

In the case of the water soluble acrylic resin used in carrying out emulsion polymerization of, a cationic water soluble acrylic resin may be employed to partially or completely neutralize and make soluble in water the acrylic resin with tertiary amino groups using an acidic compound. Further, an anionic water soluble acrylic resin may be employed for partially or completely neutralizing and making soluble in water an acrylic resin with carboxyl groups using a basic compound.

From among these, from the perspective of resistance to water and adhesive character, an anionic water soluble acrylic resin is preferably employed.

The anionic water soluble acrylic resin employed here is preferably a resin which has functional groups which reacts with reactive functional groups in tertiary amino vinyl monomer (a-1), or with the functional groups in the other copolymerizable vinyl monomer (a-2), and/or is a resin having radical polymerizable unsaturated double bonds for which graft polymerization is possible when preparing emulsion polymer (A).

The water-based medium employed when preparing this emulsion polymer (A) is not particularly limited. Rather, water alone, or a mixture of water and a water soluble organic solvent may be used.

Representative examples of the water soluble organic solvent (water soluble solvent) employed here include various alcohols such as methyl alcohol, ethyl alcohol, isopropyl alcohol, ethyl carbitol, ethyl cellosolve, and butyl cellosolve; and various polar solvents such as N-methyl pyrolidone. These may be used alone or in combinations of two or more.

In the case where a mixture of water and a water soluble solvent is employed, it is preferable to optimally select the amount of water soluble solvent employed in view of stability during polymerization. However, in view of the flammability and sanitation of the obtained water-based dispersed solution of the polymer, it is desirable that the amount of the water soluble solvent be extremely small. Accordingly, from this perspective, it is preferable to use waLer itself as the solvent.

Various polymerization methods are available when prepared emulsion polymer (A), including: a method in which water, an emulsifying agent and/or dispersion stabilizer, a polymer catalyst, and a monomer component (a) having as essential components a tertiary amino vinyl monomer (a-1) and another copolymerizable vinyl monomer (a-2), are mixed together all at once; a monomer drop method in which a monomer component (a) is added by dropping; and a pre-emulsion method in which water, a monomer component (a) and an emulsifying agent are premixed and then added by dropping. Any of these various methods may be employed to prepare the emulsion polymer (A) containing tertiary amino groups which is employed in the present invention.

However, preparation using the monomer drop method or the pre-emulsion method is preferable from the perspective of stability at the time of polymerization.

It is also possible to add a hydrophilic or hydrophobic solvent, or various conventional additives, when carrying out the polymerization reaction. However, the amount of these additives must be within limits which do not adversely affect the various properties of the cured coating obtained from the present invention's curable resin composition for use in water-based coating materials.

When preparing emulsion polymer (A), a radical polymerization initiator may be employed as a polymerization initiator. Representative examples of radical polymerization initiators include various inorganic peroxides such as potassium persulfate, ammonium persulfate, and hydrogen peroxide; various organic peroxides such as tert-butyl peroxy-2-ethyl hexanoate, benzoyl peroxide, and cumene hydroperoxide; and various azo initiators such as 4,4'-azobis (4-cyanovaleric acid), 2,2'-azobis(2-amidinopropane) dihydrochloride, and the like.

In the case where using a peroxide as the polymerization initiator, the radical polymerization reaction may be carried out using the peroxide alone, or using a so-called redux polymerization initiator which employs both a peroxide and a reducing agent such as an acidic sodium sulfite or sodium thiosulfate.

Further, various chain transfer agents may be employed as a molecular weight adjust agent, such as lauryl mercaptan, octyl mercaptan, dodecyl mercaptan, 2-mercaptoethanol, octyl thio glycolate, 3-mercaptopropionic acid, α-methyl styrene dimer, and the like.

The polymerization temperature when preparing emulsion polymer (A) will vary depending on the type of monomer used, polymerization initiator used, etc. Furthermore, in the case where carrying out polymerization in a water-based medium, a temperature in the range of 30° C. to 90° C. is preferable.

The tertiary amino groups contained in emulsion polymer (A) may be neutralized with an acid, or may not be neutralized. However, since there is a possibility that stability may deteriorate and a block occur when preparing emulsion polymer (A) or when the storage stability or the stability at the time of use is not sufficient, then the stability may be improved by using acid to neutralize at least a portion of the tertiary amino groups.

To prepared an emulsion polymer (A) in which at least a portion of its tertiary amino groups have been neutralized, various methods may be suitably employed, such as carrying out polymerization using a vinyl monomer (a-1) having a tertiary amino group which has been pre-neutralized using an acidic compound; neutralizing the tertiary amino groups by adding an acidic compound during polymerization; or neutralizing by adding an acidic compound after preparing emulsion polymer (A).

Particularly representative examples of acidic compounds which can be used in this instance include carboxylic acids with between 1 and 10 carbon atoms such as formic acid, acetic acid, propionic acid, butyric acid, 2-methyl butyric acid, iso-valeric acid, trimethyl acetic acid, glycolic acid and lactic acid; mono- or dialkyl esters of phosphoric acid such as phosphoric acid monomethyl ester, phosphoric acid dimethyl ester, phosphoric acid mono-iso-propyl ester, phosphoric acid di-iso-propyl ester, phosphoric acid mono-2-ethylhexyl ester, and phosphoric acid di-2-ethylhexyl ester; organic sulfonic acids such as methanesulfonic acid, propanesulfonic acid, benzenesulfonic acid, dodecyl benzenesulfonic acid; and various inorganic acids such as hydrochloric acid, sulfuric acid, nitric acid and phosphoric acid. Among the above acidic compounds however, the carboxylic acids are particularly preferred.

When improving stability by adding these acidic compounds, the amount of acidic compounds employed is preferably such that the ratio of the equivalent weight of the acidic compound with respect to that of the tertiary amino groups included in emulsion polymer (A), i.e., acidic compound/tertiary amino groups equivalent weight ratio, is about 0.1 or more. Furthermore, in order not to impair the properties of the coating film prepared, a ratio of between 0.1 and 3 is preferred, with a ratio of between 0.1 and 2 being even more suitable.

When preparing emulsion polymer (A) containing tertiary amino groups, in the case where acidic groups are introduced into emulsion polymer (A) by using a vinyl monomer having an acidic group as the other copolymerizable vinyl monomer (a-2), the acidic group may be neutralized using a basic compound, or may not be neutralized. However, it is preferable to neutralize at least a portion of the acidic groups with a basic compound, with a view toward decreasing block generation by improving stability during preparation of emulsion polymer (A), and with a view toward improving stability during storage and use.

Various methods may be suitably employed when prepared emulsion polymer (A) having neutralized acidic groups, including a method in which vinyl monomers having acidic group which have been pre-neutralized with a basic compound are copolymerized; a method in which the acidic groups are neutralized by adding basic compound during polymerization; and a method in which neutralization is carried out by adding the basic compound after preparing emulsion polymer (A).

Conventional compounds maybe employed for the aforementioned basic substance, including various alkali metal compounds such as sodium hydroxide and potassium hydroxide; various alkali earth metal compounds such as calcium hydroxide and calcium carbonate; ammonia; and various water soluble organic amines such as monomethyl amine, dimethyl amine, trimethyl amine, monoethyl amine, diethyl amine, triethyl amine, monopropyl amine, dimethyl propyl amine, monoethanol amine, diethanol amine, triethanol amine, ethylene diamine, and diethylene triamine. These may be used alone or together.

When further improvement in water resistance of the coating of emulsion polymer (A) is desired, for example, it is preferable to employ a low-boiling point amine such as ammonia or triethyl amine, which volatilizes at room temperature or upon heating.

When neutralizing the acidic groups included in polymer (A) using these basic compounds, the amount added is such that the ratio of the equivalent weight of the basic groups in the basic compound to that of the acidic groups included in emulsion polymer (A) containing tertiary amino groups, i.e., weight equivalent ratio of basic compound/acidic groups in emulsion polymer (A) containing tertiary amino groups, is 0.1 or greater. Moreover, a weight equivalent ratio in the range of 0.1 to 3 is preferred as a range which will not impair the properties of the obtained coating, with a range of 0.1 to 2 being even more suitable.

The number-average molecular weight of a thus-prepared emulsion polymer (A) is roughly 5,000 or greater, with 30,000 or greater being preferred, and 50,000 or greater being even more suitable.

The concentration of the solid content in emulsion polymer (A) containing tertiary amino groups is preferably around 20 to 70 by weight, and more preferably 20 to 60% by weight.

By setting the concentration of the solid content to be 70% by weight or less, it is possible to restrict an abnormal increase in viscosity of the polymer, facilitating heat removal during polymerization of the monomer. Accordingly, emulsion polymer (A) can be easily and stably prepared.

Further, setting the concentration of the solid content to be 60% by weight or less is even more desirable, since, in this case, the viscosity of polymer (A) is within the range demanded for various applications.

On the other hand, in view of productivity and the like, it is preferable to set the concentration of the solid content to be about 20% by weight or more.

The particle diameter of emulsion polymer (A) is not particularly restricted. For example, an average particle diameter in the range of 30 to 1,000 nm is preferable from the perspective of ease of film formation.

Next, representative examples of vinyl polymers having both epoxy groups and hydrolyzable silyl groups, silane coupling agents having epoxy groups, and silicone resins having both epoxy groups and hydrolyzable silyl groups will be cited as examples of compound (B) which has both, at least, an epoxy group and a hydrolyzable silyl group in a single molecule.

Hydrolyzable silyl group as used here refers to groups of atoms which contain a silicon atom which is bonded to, for example, a halogen atom, or an alkoxy, substituted alkoxy, phenoxy, isopropenyloxy, acyloxy or iminooxy group, and which are easily hydrolyzable to form a silanol group. Particularly representative examples include the alkoxy silyl, phenoxy silyl, halo silyl, isopropenyloxy silyl, acyloxy silyl, and iminooxy silyl groups.

Any of wellknown methods can be used to prepare the vinyl polymers containing these two reactive groups as specified above, but the recommended methods include: (i) a solution radical copolymerization of a vinyl monomer containing epoxy groups and a vinyl monomer containing a hydrolyzable silyl group, such as those compounds cited above as copolymerizable monomers employed when preparing emulsion polymer (A); (ii) a solution radical copolymerization of a mixture of monomers which include one of the various epoxy vinyl monomers mentioned above, one of various vinyl monomers with hydrolyzable silyl groups, and another vinyl monomer which is co-polymerizable with these; (iii) a solution radical (co)polymerization of a mixture of monomers which include one of the aforementioned various epoxy vinyl monomers as an essential monomer component, in the presence of one of the various chain transfer agents which include a hydrolyzable silyl group, such as γ-mercaptopropyl trimethoxy silane, γ-mercaptopropyl triethoxy silane, γ-mercaptopropyl methyldimethoxy silane, γ-mercaptopropyl triisopropenyloxy silane, or the like; and (iv) other methods which suitably combine the preceding methods (i) or (ii) with method (iii).

Representative examples of the epoxy silane coupling agents mentioned above include various epoxy silane compounds such as γ-glycidoxypropyltrimethoxysilane, γ-glycidoxypropyltriethoxysilane, γ-glycidoxypropylmethyldimethoxysilane, γ-glycidoxypropylmethyldiethoxysilane, β-(3,4-epoxycyclohexyl)ethyltrimethoxy silane, β-(3,4-epoxycyclohexyl)ethyltriethoxysilane, β-(3,4-epoxycyclohexyl)ethylmethyldiethoxysilane, and γ-glycidoxypropyltriisopropenyloxysilane; the addition products of various isocyanato silane compounds, such as γ-isocyanato propyl triisopropenyloxy silane or γ-isocyanato propyl trimethoxy silane, with glycidol; the addition products of various amino silane compounds, such as γ-aminopropyl trimethoxy silane, with diepoxy compounds;

or compounds which contain two or more hydrolyzable silyl groups and two or more epoxy groups in a molecule, formed by a partial hydrolysis condensation of the various epoxy silane compounds mentioned above.

Particularly representative examples of the aforementioned silicone resins which contain both epoxy and hydrolyzable silyl groups are the cyclic tetra siloxanes, the general formula of scheme (2) for which is shown below.

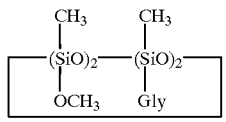
(2)

(Note, the Gly in this diagram represents a 3-glycidoxy propyl group.)

In the preparation of a curable resin composition for use in water-based coating materials detailed in this invention, which contains the aforementioned emulsion polymer (A) containing tertiary amino groups and compound (B) containing both an epoxy and a hydrolyzable silyl groups as essential film-forming components, the two constituents (A) and (B) should be mixed together in a proportion that will yield a molar ratio of the tertiary amino group in emulsion polymer (A) to the epoxy group in compound (B) in the range of about 0.1 to 5, and preferably 0.3 to 3.0, and even more preferably, in the range of 0.5 to 2.0. (However, in the case where emulsion polymer (A) contains acidic groups, the molar number of the acidic groups is also added to the molar number of the tertiary amino groups in the emulsion polymer (A)).

Next, an explanation will be made of the method of preparation of water-based compound (C), an additional essential component of the present invention, which is obtained by adding a neutralizing agent to a vinyl polymer (I) containing carboxyl groups and/or tertiary amino groups so that at least 10% of the acidic groups and/or tertiary amino groups are neutralized, and then dispersing or dissolving in water.

To begin with, representative examples of vinyl polymers (I) containing carboxyl groups and/or tertiary amino groups include the various acrylic, aromatic vinyl, vinyl ester, and fluoro olefin polymers.

From among these vinyl polymers (I), acrylic polymers and fluoro olefin polymers are particularly preferred.

Vinyl polymers (I) include 1) vinyl polymer (I-1) containing tertiary amino groups, 2) vinyl polymer (I-2) containing both carboxyl groups and tertiary amino groups, and 3) vinyl polymer (I-3) containing carboxyl groups. Respectively, these include:

(α) water-based compound (C-1) obtained using vinyl polymer (I-1) and an acidic compound as a neutralizing agent, (β) water-based compound (C-2) obtained using vinyl polymer (I-2) and an acidic compound as a neutralizing agent, (γ) water-based compound (C-3) obtained using vinyl polymer (I-2) and a basic compound as a neutralizing agent, and (δ) water-based compound (C-4) obtained using vinyl polymer (I-3) and a basic compound as a neutralizing agent.

Water-based compound (C-1), which is obtained by using an acidic compound to partially or completely neutralize vinyl polymer (I-1) which has tertiary amino groups, and then dispersing or dissolving in water, will be explained below.

Vinyl polymer (I-1) containing tertiary amino groups can be easily prepared using a variety of wellknown methods. For example, a method such as (1) copolymerizing a vinyl monomer containing a tertiary amino group with another copolymerizable monomer, or (2) carrying out a dehydrative imidization treatment following the addition reaction of a compound containing both tertiary amino and primary amino groups to a vinyl polymer containing acid anhydride groups, as disclosed in Japanese Patent, First Publication No. Sho 59-56243, may be suitably employed.

Of these, method (1) above is the most simple and convenient to carry out, and is thus most suitable.

Particularly suitable examples of the tertiary amino vinyl monomers used to prepare the tertiary amino vinyl polymer (I-1) described in preparation method (1) above include the various compounds cited above which are employed in the preparation of emulsion polymer (A). Further, suitable examples of the other vinyl monomers which are copolymerizable with the various aforementioned tertiary amino vinyl monomers include those compounds cited above which are employed in the preparation of polymer (A).

When preparing a fluoro olefin polymer from among these various vinyl polymers, fluoro olefin and a tertiary amino monomer may be employed as the essential starting components, with monomers copolymerizable with these also used as necessary.

Representative examples of the fluoro olefin employed in this case include vinyl fluoride, vinylidene fluoride, trifluoroethylene, tetrafluoroethylene, hexafluoropropylene, and chlorotrifluoroethylene.

When preparing a tertiary amino vinyl polymer (I-1) from these various monomers, one of the wellknown methods may be employed. However, from among these, a solution radical polymerization method is recommended as it is the easiest employed.

Representative examples of solvents used in this case include various hydrocarbons like toluene, xylene, cyclohexane, n-hexane and octane; the various alcohol solvents such as methanol, ethanol, iso-propanol, n-butanol, iso-butanol, sec-butanol, ethylene glycol monomethyl ether, ethylene glycol mono ethyl ether, ethylene glycol mono iso-propyl ether, and ethylene glycol monobutyl ether; the various esters such as methyl acetate, ethyl acetate, n-butyl acetate, and amyl acetate; and the various ketone solvents such as acetone, methyl ethyl ketone, methyl iso-butyl ketone, and cyclohexanone. All of these solvents may be used separately or in mixtures of 2 or more solvents. Water may also be added.

Polymerization can be carried out by normal methods, using the selected solvent and any well-known radical polymerization initiators such as azo or peroxide compounds. Furthermore, if required, chain transfer reagents such as those cited above which are application when preparing emulsion polymer (A) may be used as molecular weight adjusting agents.

A tertiary amino vinyl polymer (I-1) prepared in this way should contain between about 0.03 and 2.5 moles of tertiary amino groups per 1,000 grams of solid content of polymer (I-1), with between 0.05 and 1.5 moles being preferable, and between 0.05 and 0.5 moles being even more suitable.

Furthermore, the number-average molecular weight for the polymer (I-1) should be in the range of about 500 to 100,000, and preferably in the range 1,000 to 30,000.

Moreover, in cases where hydroxyl groups are introduced into the vinyl polymer (I-1) containing tertiary amino groups, by for example using a monomer containing a hydroxyl group as one of the comonomer cited above, then the curability of this invention's composition, which will contain the water-based product (C-1) formed from this polymer (I-1) as the essential component for the formation of the coating film, can be improved even further, producing a coating film which has even better film appearance, even better resistance to solvents, and an even greater level of hardness.

In those instances where hydroxyl group is introduced into the vinyl polymer (I-1) containing tertiary amino groups, then 1,000 grams of solid content of polymer (I-1) should contain between 0.04 and 2 moles, and preferably between 0.08 and 1.2 moles, of hydroxyl group.

By adding an acidic compound to the tertiary amino vinyl polymer (I-1) prepared by the method mentioned above, the tertiary amino groups in the polymer are partially or completely neutralized, and a polymer which is soluble or dispersible in water is prepared.

Particularly representative acidic compounds which can be used in this instance include those acidic compounds cited above, with carboxylic acids being particularly preferred from among these.

The quantity of acidic compound to be added to the polymer (I) should be at least enough to generate dispersibility in the vinyl polymer (I-1) outlined above, and the ratio of the equivalent weight of the acidic compound to that of the tertiary amino groups included in vinyl polymer (I-1), in other words: acidic groups in the acidic compound/ tertiary amino groups in polymer (I-1) weight equivalent ratio, should be 0.1 or greater, but in order not to impair the properties of the coating film generated, a ratio of between 0.1 and 3 is preferred, with a ratio of between 0.1 and 2 being even more suitable.

The previously mentioned water-based product (C-1) can be prepared from the thus prepared neutralized vinyl polymer (I-1) using various wellknown methods. For example, water can be simply added to the neutralized material, or alternatively, the neutralized material added to water to produce the water-based product (C-1).

Furthermore, the water-based product (C-1) can be prepared, as required, with either partial, or complete removal of the organic solvent used in the preparation of the tertiary amino vinyl polymer (I-1), by removing the solvent under heat, or under reduced pressure. Accordingly, a water-based product (C-1) can be prepared which contains very little or no organic solvent.

Next, we will explain the previously mentioned water-based product (C-2), obtained by dispersing or dissolving in water, a vinyl polymer (I-2) containing both tertiary amino groups and carboxyl groups to which has been added an acidic compound so that the ratio of the equivalent weight of acidic groups in the added acidic compound to that of the tertiary amino groups in the vinyl polymer (I-2) is at least 0.1.

This vinyl polymer (I-2) containing both tertiary amino groups and carboxyl groups can be prepared by various wellknown methods. For example, (3) a mixture of monomers containing a tertiary amino vinyl monomer and an acidic vinyl monomer can be polymerized; (4) as presented in Japanese Patent, First Publication, No. Sho 59-56243, a vinyl polymer containing a carboxylic acid anhydride group can be reacted with a compound whici contains a tertiary amino group and a group with an active hydrogen; (5) a vinyl polymer containing hydroxyl and tertiary amino groups can be reacted with a dicarboxylic acid anhydride; or (6) a mixture of monomers containing a vinyl monomer containing a tertiary amino group, and a vinyl monomer containing a blocked acidic group such as a trialkyl silyl ester group, a hemiacetal ester group, or a tert-butyl ester group, which can easily be converted to a free acidic group by the action of acid, heat or water, can be polymerized, producing a vinyl polymer with tertiary amino and blocked acidic groups, which can then have the blocked acidic groups converted to free acidic groups. Among the methods outlined, method (3) is particularly recommended, because it is the most simple and convenient.

The vinyl monomer containing a tertiary amino group required to prepare the vinyl polymer (I-2) containing both tertiary amino and acidic groups by method (3) above, can be any of the various vinyl monomers containing a tertiary amino group mentioned previously which may be employed in the preparation of emulsion polymer (A).

Furthermore, particularly suitable vinyl monomers containing acidic group for the preparation of this vinyl polymer (I-2) include the various vinyl monomers containing carboxyl acid groups, phosphoric acid groups or sulfonic acid groups, which are applicable in the preparation of emulsion polymer (A). Among these, the use of monomers containing carboxylic acid group is desirable.

Furthermore, other copolymerizable vinyl monomers which can be used in the preparation of the vinyl polymer (I-2) include the various vinyl monomers previously mentioned in the discussion regarding preparation of emulsion polymer (A).

In the case where preparing a fluoro olefin polymer from among the vinyl polymers (I-2), fluoro olefins cited above in connection with the preparation of tertiary amino vinyl polymer (I-1) may be employed as the essential monomer component.

In an example of preparation of the vinyl polymer (I-2) from the various aforementioned monomers, both solvents and initiators can be used according to the preparation method of the vinyl polymer (I-1).

A vinyl polymer (I-2) prepared in this method should contain between about 0.03 and 2.5 moles of introduced tertiary amino groups per 1,000 grams of solid content of polymer (I-2), with between 0.05 and 1.5 moles being preferable, and between 0.05 and 0.5 moles being even more suitable.

Furthermore, a vinyl polymer (I-2) prepared in this method should contain acidic groups in the amount of about 0.07 to 5.0 moles, with between 0.07 and 2.0 moles being preferable, and between 0.1 and 0.7 moles being even more suitable. Moreover, the number-average molecular weight for vinyl polymer (I-2) should be in the range of about 500 to 100,000, and preferably in the range of 1,000 to 30,000.

Furthermore, in cases where hydroxyl groups are introduced into the vinyl polymer (I-2) containing both tertiary amino and acidic groups, by for example using a monomer containing a hydroxyl group as one of the comonomers cited above, then the curability of this invention's composition, which will contain the water-based product (C-2) formed from this polymer (I-2) as the essential component for the formation of the coating film, can be improved further, producing a coating film which has an even better film appearance and resistance to solvents, as well as a higher level of hardness.

In those instances where hydroxyl groups are introduced into the vinyl polymer (I-2) containing both tertiary amino and acidic groups, then 1,000 grams of solid content of polymer (I-2) should contain between 0.04 and 2 moles, and preferably between 0.08 and 1.2 moles, of hydroxyl groups.

By adding an acidic compound to the vinyl polymer (I-2) containing both tertiary amino and acidic groups formed by the method mentioned above, the tertiary amino groups in the polymer are partially, or completely neutralized, and a polymer which is soluble or dispersible in water is prepared.

The acidic compound used in this step can be any of the acidic compounds mentioned previously as being suitable in the preparation of the water-based product (C-1), but of these, carboxylic acids are the most suitable.

The quantity of the acidic compound to be added to the polymer should be sufficient to ensure that the ratio of the equivalent weight of acidic groups in the added acidic compound to that of the tertiary amino groups in the vinyl polymer (I-2) is at least 0.1, with a ratio of between 0.1 and 3 preferred, and a ratio of between 0.1 and 2 being even more suitable.

The previously mentioned water-based product (C-2) can be prepared from the thus prepared neutralized vinyl polymer (I-2) prepared by this method, containing both tertiary amino and acidic groups, by the same methods outlined above for preparing the water-based product (C-1) from the neutralized vinyl polymer (I-1).

Next, we will explain the previously mentioned water-based product (C-3), obtained by adding a basic compound to a vinyl polymer (I-2) containing both tertiary amino and acidic groups so that the weight equivalent ratio of basic groups in the added basic compound to acidic groups in the vinyl polymer (I-2) is at least 0.1, and then dispersing or dissolving in water.

Firstly, the vinyl polymer (1-2) containing both tertiary amino and acidic groups can be prepared by the method already described in the discussion concerning the preparation of water-based product (C-2).

Furthermore, in cases where hydroxyl groups are introduced into the vinyl polymer (I-2) containing both tertiary amino and acidic groups, by, for example, using a monomer containing a hydroxyl group as one comonomer, then the curing properties of this invention's composition, which will contain the water-based product (C-3) prepared from this polymer (I-2), can be improved even further, preparing a coating film which has even better film appearance, even better resistance to solvents, and an even greater level of hardness.

In those instances where hydroxyl groups are introduced into the vinyl polymer (I-2) containing both tertiary amino and acidic groups, then 1,000 grams of solid content of polymer (I-2) should contain between 0.04 and 2 moles, and preferably between 0.08 and 1.2 moles, of hydroxyl groups.

By adding a basic compound as a neutralizer to the vinyl polymer (I-2) containing both tertiary amino and acidic groups prepared by the method mentioned above, the acidic groups in the polymer are partially or completely neutralized, and a polymer which is soluble or dispersible in water is prepared.

Particularly representative examples of basic compounds which can be used in this instance include the various compounds cited above in connection with the preparation of emulsion polymer (A), wherein, from among the various basic compounds cited, ammonia and various organic amines are particularly preferred.

The quantity of basic compound to be added to the polymer should be sufficient to ensure that the ratio of the equivalent weight of the basic groups in the added basic compound to acidic groups in the vinyl polymer (I-2) is at least 0.1, with a ratio of between 0.1 and 3 being preferred, and a ratio of between 0.1 and 2 being more suitable.

In order to prepare the water-based product (C-3) from the thus formed mixture of basic compound and vinyl polymer (I-2) having tertiary amino and acidic groups, the same methods outlined above for preparing the water-based product (C-1) from the neutralized vinyl polymer (I) can be used.

Next, we will explain the previously mentioned water-based product (C-4), obtained by dispersing or dissolving an acidic vinyl polymer (I-3) in water which has been partially or completely neutralized by a basic compound.

This acidic vinyl polymer (I-3) can be prepared by various wellknown methods. For example, (7) a vinyl monomer containing an acidic group can be copolymerized with another copolymerizable vinyl monomer; (8) a vinyl monomer containing a hydroxyl group can be reacted with a dicarboxylic acid anhydride; or (9) as was described previously, a vinyl monomer with a blocked acidic group can be copolymerized with another suitable vinyl polymer, and the blocked acidic group then converted to a free acidic group.

Of these methods, method (7) is recommended as it is the simplest and most convenient.

The vinyl monomer containing an acidic group required to prepare the vinyl polymer (I-3) containing an acidic group by method (7) above can, of course, be any of the various acidic vinyl monomers mentioned previously as suitable monomers for the production of the vinyl polymer (I-2) containing both tertiary amino and acidic groups.

Of these, monomers containing carboxylic acid group are particularly suitable.

Furthermore, other copolymerizable vinyl monomers which can be used in the preparation of the vinyl polymer (I-3) include, of course, the various vinyl monomers previously mentioned in the discussion regarding preparation of vinyl polymer (I-1).

In the case where preparing fluoro olefin polymer from among the aforementioned vinyl polymers (I-3), fluoro olefins cited in connection with the preparation of vinyl polymer (I-1) containing tertiary amino groups may be employed as the essential monomer component.

Similar solvents and initiators used in the preparation of the vinyl polymer (I-3) may also be selected, respectively from those mentioned earlier in this invention for production of vinyl polymer (I-1).

A vinyl polymer (I-3) prepared in this method should contain between about 0.07 and 5.0 moles of introduced acidic groups per 1,000 grams of solid content of polymer (I-3), with between 0.3 and 2.0 moles being preferable. Furthermore, the number-average molecular weight for the vinyl polymer (I-3) should be in the range of about 500 to 100,000, and preferably in the range of 1,000 to 30,000.

Moreover, in cases where hydroxyl groups are introduced into the vinyl polymer (I-3) containing acidic groups, by, for example, using a monomer containing a hydroxyl group as a comonomer, then the curability of this invention's composition, which will contain the water-based product (C-4) formed from this polymer (I-3) as the constituent necessary for the preparation of the coating film, can be improved even further, preparing a coating film which has even better film appearance, even better resistance to solvents, and an even greater level of hardness.

In those instances where hydroxyl groups are introduced into the vinyl polymer (I-3) containing acidic groups, then 1,000 grams of solid content of polymer (I-3) should contain between 0.04 and 2 moles, and preferably between 0.08 and 1.2 moles of hydroxyl groups.

By adding a basic compound to the vinyl polymer (I-3) containing an acidic group prepared by the method mentioned above, the acidic groups in the polymer (I-3) are partially or completely neutralized, and then a polymer which is soluble or dispersible in water is prepared.

The basic compound used in this method can, of course, be any of the compounds mentioned previously as being suitable in the preparation of the water-based product (C-4), but among them, ammonia and organic amines are suitable.

The quantity of basic compound to be added to the polymer, should be sufficient to ensure that the ratio of the equivalent weight of the basic groups in the added basic compound to that of the acidic groups in the vinyl polymer (I-3) is at least 0.1, with a ratio of between 0.1 and 3 being preferred, and a ratio of between 0.1 and 2 being even more suitable.

In order to prepare the water-based product (C-4) from the thus formed mixture of vinyl polymer (I-3) containing acidic groups and basic compound, the same method as outlined above for preparing the water-based product (C-1) from the neutralized vinyl polymer (I-1) may be used.

When preparing the present invention's curable resin composition for use in water-based coating materials from emulsion polymer (A), compound (B) containing, at least, an epoxy group and a hydrolyzable silyl group, and water-based compound (C), component (B) is mixed into a base resin obtained by mixing component (A) and component (C) so that the weight ratio of the solid content of (A) to the solid content of (C) is in the range of about 98/2 to 2/98, with a range of 95/5 to 5/95 being preferred and 85/15 to 15/85 being even more suitable, so that the ratio of the total molar number of tertiary amino and acidic groups included in component (A) and component (C) to the molar number of epoxy groups included in component (B) is in the range of about 0.1 to 5.0, with a range of 0.3 to 3 being preferred and 0.5 to 2.0 being even more suitable.

Furthermore, by removing compound (B) containing an epoxy and a hydrolyzable silyl groups from a composition comprising components (A), (B) and (C), and adding a compound (D) containing hydrolyzable silyl and/or silanol groups, it is possible to even further improve the cured coating's resistance to weathering, corrosion, water and dirt shedding, while also increasing the hardness thereof.

Representative examples of compound (D) containing hydrolyzable silyl and/or silanol groups include silicate compounds like methyl silicate, ethyl silicate, isopropyl silicate, and n-butyl silicate; silicate oligomers obtained by partial hydrolysis and condensation of the aforementioned silicate compounds; various trifunctional silane compounds such as methyltrimethoxysilane, phenyl trimethoxysilane, methyltriethoxysilane, phenyltriethoxysilane, and isobutyl-trimethoxysilane; various difunctional silane compounds such as dimethyldimethoxysilane, dimethyldiethoxysilane, diethyldimethoxysilane, diethyldiethoxysilane, and diphenyldimethoxysilane; low molecular weight silanol compounds obtained by virtually complete hydrolysis of the trifunctional and difunctional silane compounds mentioned above, or of the various halo silanes such as methyltrichlorosilane, phenyltrichlorosilane, ethyltrichlorosilane, dimethyldichlorosilane, and diphenyldichlorosilane; linear or cyclic polysiloxanes containing silanol group, obtained by carrying out a dehydration condensation on the silanol compounds mentioned above; and linear, branched or cyclic polysiloxanes containing alkoxysilyl group, obtained by carrying out a partial hydrolysis and condensation on at least one of the compounds from the group of aforementioned difunctional and trifunctional silane compounds and silicate compounds.

When preparing the present invention's curable resin composition for use in water-based coating materials comprising components (A), (B), (C), and, additionally, (D), the amount of aforementioned compound (D) added to a composition obtained by mixing the three components (A), (B), and (C) at the proportions cited above should be within a range of about 0.5 to 200 parts by weight, and preferably 1 to 100 parts by weight, with respect to 100 parts by weight of the solid content of the resins from components (A) and (C).

Furthermore, if necessary, a curing catalyst (E) may be added to the curable resin compositions for use in water-based coating materials described in this invention. Addition of such a catalyst results in an improvement in the curability of the compositions.

Representative examples of the catalyst (E) include various basic compounds such as lithium hydroxide, sodium hydroxide, potassium hydroxide, and sodium methylate; various metallic compounds such as tetraisopropyl titanate, tetra-n-butyl titanate, tin octylate, lead octylate, cobalt octylate, zinc octylate, calcium octylate, zinc naphthenate, cobalt naphthenate, di-n-butyl tin diacetate, di-n-butyl tin dioctoate, di-n-butyl tin dilaurate and di-n-butyl tin maleate; and various acidic compounds such as p-toluenesulfonic acid, trichloroacetic acid, phosphoric acid, monoalkyl phosphoric acid, dialkyl phosphoric acid, monoalkyl phosphonic acid and dialkyl phosphonic acid.

Furthermore, if necessary, various wellknown additives may be added to the curable resin compositions for use in water-based coating materials described in this invention. Such additives include various coalescing agents such as isopropyl alcohol, sec-butanol, n-butanol, 2-ethyl hexanol, 2-propoxy ethanol, 2-n-butoxy ethanol, 2-n-propoxy propanol, 3-n-propoxy propanol, 2-n-butoxy propanol, 3-n-butoxy propanol, 2-n-butoxyethyl acetate, diethylene glycol monobutyl ether, N-methylpyrrolidone, 2,2,4- trimethyl-1, 3-pentanediol monobutarate, dibutyl phthalate ester and butylbenzyl phthalate ester; fillers; organic pigments; inorganic pigments; metallic pigments such as aluminum; pH adjusters; leveling reagents; thickeners; water repellents; anti-foaming agents; plasticizers; antioxidants; UV absorbers; anticratering agent; anti-skinning agent; dispersing agents; and the like.

When using the curable resin compositions for use in water-based coating materials described in this invention, and outlined above, a so-called two component system is used with the constituent compound (B) containing both epoxy and hydrolyzable silyl groups being mixed with the other constituents immediately before use. The mixture should then be painted within one day (24 hours), with paint inside of 12 hours being preferable. Particular care needs to be taken in this respect, as if left for more than one day, the curability at room temperature of the composition decreases markedly.

The curable compositions for use in water-based coating materials described in this invention can be used with conventional methods to paint various substrates, and then either dried at room temperature for between 1 and 10 days, force dried at between 40 and 100° C. for between 1 and 60 minutes, or bake dried at between 100 and 180° C. for between 1 and 60 minutes. This process provides an excellent coating film that has excellent weather resistant, and excellent resistance to solvents, chemicals and water.

EXAMPLES

Next, we will attempt to explain the invention in more concrete terms, by giving reference, working and comparative examples. Note, however, that this in no way implies that the invention is limited to the examples illustrated. Unless specified otherwise, reference in these examples to 'parts' or 'percentages' refers to weight standards.

Reference Example 1

[Preparation of an emulsion polymer (A) containing tertiary amino groups]

Deionized water in the amount of 1,500 parts was added to a reaction vessel equipped with a stirrer, thermometer, condenser, dlopping funnel, and nitrogen gas inlet, after which 40 parts of "EMULGEN 950" (commercial name of poly(oxyethylene)nonylphenyl ether manufactured by Kao Corp.) was added. The emulsifying agent was then dissolved by raising the temperature to 80° C. as the mixture was stirred and nitrogen gas was introduced into the reaction vessel.

5 parts of ammonium persulfate was then added, after which a mixture consisting of 500 parts of methyl methacrylate, 470 parts of n-butyl acrylate, 30 parts of N,N-dimethylaminoethyl methacrylate, and 1.0 part of n-dodecyl mercaptan was added dropwise over 3 hours, to carry out the polymerization reaction. Following completion of the drop addition, the mixture was maintained at 80° C. for 2 hours while stirring was continued.

Next, the contents of the vessel were cooled, after which ammonia water was added to adjust the pH to in excess of 8. Deionized water was then added so that the concentration of the solid content was 40.0%, after which the mixture was filtered through a 100 mesh wire gauze.

The thus-obtained emulsion polymer had a solid content concentration of 40.0%, a pH of 8.1, and a viscosity of 80 cps according to a BM viscometer at 25° C. (same hereinafter). In addition, the aggregate which did not pass through the 100 mesh wire gauze was 0.1 or less (ratio relative to water dispersed solution). Hereinafter, this emulsion polymer will be referred to as A-1.

Reference Example 2

[Preparation of an emulsion polymer (A) containing tertiary amino groups]

Deionized water in the amount of 1,500 parts was added to a reaction vessel of the same type as employed in reference example 1, after which 40 parts of "EMULGEN 950" was added. The emulsifying agent was then dissolved by raising the temperature to 80° C. as the mixture was stirred and nitrogen gas was introduced into the reaction vessel.

5 parts of ammonium persulfate was then added, after which a mixture consisting of 500 parts of cyclohexyl methacrylate, 370 parts of 2-ethylhexyl methacrylate, 100 parts of 2-ethylhexyl acrylate, 10 parts of acrylic acid, 20 parts of N,N-dimethylaminoethyl methacrylate, and 1.0 parts of n-dodecyl mercaptan was added dropwise over 3 hours, to carry out the polymerization reaction.

Following completion of the drop addition, the mixture was maintained at 80° C. for 2 hours while stirring was continued. The contents of the vessel were then cooled, and deionized water was added until the concentration of the solid content was 40.0%. The mixture was then filtered through a 100 mesh wire gauze.

The thus-obtained emulsion polymer had a solid content concentration of 40.0%, a pH of 5.2, and a viscosity of 10 cps. In addition, the aggregate which did not pass through the 100 mesh wire gauze was 0.1% or less (ratio relative to water dispersed solution).

This emulsion polymer containing tertiary amino groups was determined to contain 0.127 moles of tertiary amino group and 0.139 moles of carboxyl group per 1,000 grams of solid content thereof. Hereinafter, this emulsion polymer will be referred to as A-2.

Reference Example 3

[Preparation of emulsion polymer (A) containing tertiary amino groups]

Deionized water in the amount of 1,500 parts was added to a reaction vessel of the same type as employed in reference example 1, after which 40 parts of "EMULGEN 950" was added. The emulsifying agent was then dissolved by raising the temperature to 80° C. as the mixture was stirred and nitrogen gas was introduced into the reaction vessel.

5 parts of ammonium persulfate was then added, after which a mixture consisting of 500 parts of methyl methacrylate, 470 parts of n-butyl acrylate, 10 parts of acrylic acid, 20 parts of N,N-dimethylaminoethyl methacrylate, and 1.0 part of n-dodecyl mercaptan was added dropwise over 3 hours, to carry out the polymerization reaction.

Following completion of the drop addition, the mixture was maintained at 80° C. for 2 hours while stirring was continued. Next, the contents of the vessel were cooled, after which ammonia water was added to adjust the pH to in excess of 8. Deionized water was then added so that the concentration of the solid content was 40.0%, after which the mixture was filtered through a 100 mesh wire gauze.

The thus-obtained emulsion polymer had a solid content concentration of 40.0%, a pH of 8.1, and a viscosity of 80 cps. In addition, the aggregate which did not pass through the 100 mesh wire gauze was 0.1% or less (ratio relative to water dispersed solution).

This emulsion polymer containing tertiary amino groups was determined to contain 0.127 moles tertiary amino group and 0.139 moles carboxyl group per 1,000 grams of solid content thereof. Hereinafter, this emulsion polymer will be referred to as A-3.

Reference Example 4

[Preparation of emulsion polymer (A) containing tertiary amino groups]

Deionized water in the amount of 1,500 parts was added to a reaction vessel of the same type as employed in reference example 1, after which 40 parts of "EMULGEN 950" was added. The emulsifying agent was then dissolved by raising the temperature to 80° C. as the mixture was stirred and nitrogen gas was introduced into the reaction vessel.

5 parts of ammonium persulfate was then added, after which a mixture consisting of 450 parts of cyclohexyl methacrylate, 370 parts of 2-ethylhexyl methacrylate, 100 parts of 2-ethylhexyl acrylate, 50 parts of 2-hydroxy ethyl acrylate, 10 parts of acrylic acid, 20 parts of N,N-dimethylaminoethyl methacrylate, and 1.0 part of n-dodecyl mercaptan was added dropwise over 3 hours, to carry out the polymerization reaction. Following completion of the drop addition, the mixture was maintained at 80° C. for 2 hours while stirring was continued.

Next, the contents of the vessel were cooled, after which ammonia water was added to adjust the pH to 8.5. Deionized water was then added so that the concentration of the solid content was 40.0%, after which the mixture was filtered through a 100 mesh wire gauze.

The thus-obtained emulsion polymer had a solid content concentration of 40.0%, a pH of 8.3, and a viscosity of 50 cps. In addition, the aggregate which did not pass through the 100 mesh wire gauze was 0.1% or less (ratio relative to water dispersed solution).

This emulsion polymer containing tertiary amino groups was determined to contain 0.127 moles of tertiary amino group and 0.139 moles of carboxyl group per 1,000 grams of solid content thereof. Hereinafter, this emulsion polymer will be referred to as A-4.

Reference Example 5

[Preparation of emulsion polymer (A) containing tertiary amino groups]

Deionized water in the amount of 1,500 parts was added to a reaction vessel of the same type as employed in reference example 1, after which 40 parts of "EMULGEN 950" was added. The emulsifying agent was then dissolved by raising the temperature to 80° C. as the mixture was stirred and nitrogen gas was introduced into the reaction vessel.

5 parts of ammonium persulfate was then added, after which a mixture consisting of 499 parts of cyclohexyl methacrylate, 370 parts of 2-ethylhexyl methacrylate, 100 parts of 2-ethylhexyl acrylate, 10 parts of acrylic acid, 20 parts of N,N-dimethylaminoethyl methacrylate, and 1.0 parts of γ-methacryloyloxypropyltrimethoxy silane, and 1.0 parts of n-dodecyl mercaptan was added dropwise over 3 hours, to carry out the polymerization reaction.

Following completion of the drop addition, the mixture was maintained at 80° C. for 2 hours while stirring was continued. Next, the contents of the vessel were cooled, after which ammonia water was added to adjust the pH to in excess of 8. Deionized water was then added so that the concentration of the solid content was 40.0%, after which the mixture was filtered through a 100 mesh wire gauze.

The thus-obtained emulsion polymer had a solid content concentration of 40.0%, a pH of 8.3, and a viscosity of 63 cps. In addition, the aggregate which did not pass through the 100 mesh wire gauze was 0.1% or less (ratio relative to water dispersed solution).

This emulsion polymer containing tertiary amino groups was determined to contain 0.127 moles of tertiary amino group and 0.139 moles of carboxyl group per 1,000 grams of solid content thereof. Hereinafter, this emulsion polymer will be referred to as A-5.

Reference Example 6

[Preparation of emulsion polymer (A) containing tertiary amino groups]

Deionized water in the amount of 1,500 parts was added to a reaction vessel of the same type as employed in reference example 1, after which 40 parts of "EMULGEN 950" was added. The emulsifying agent was then dissolved by raising the temperature to 80° C. as the mixture was stirred and nitrogen gas was introduced into the reaction vessel.

5 parts of azobis(amidinopropane dihydrochloride) was then added, after which a mixture consisting of 449 parts of cyclohexyl methacrylate, 370 parts of 2-ethylhexyl methacrylate, 100 parts of 2-ethylhexyl acrylate, 10 parts of acrylic acid, 20 parts of N,N-dimethylaminoethyl methacrylate, and 1.0 parts of γ-methacryloyloxypropyltrimethoxy silane, 50 parts of 2-hydroxyethyl methacrylate and 1.0 parts of n-dodecyl mercaptan was added dropwise over 3 hours, to carry out the polymerization reaction.

Following completion of the drop addition, the mixture was maintained at 80° C. for 2 hours while stirring was continued. Next, the contents of the vessel were cooled, after which ammonia water was added to adjust the pH to in excess of 8. Deionized water was then added so that the concentration of the solid content was 40.0%, after which the mixture was filtered through a 100 mesh wire gauze.

The thus-obtained emulsion polymer had a solid content concentration of 40.0, a pH of 8.3, and a viscosity of 28 cps. In addition, the aggregate which did not pass through the 100 mesh wire gauze was 0.1% or less (ratio relative to water dispersed solution).

This emulsion polymer containing tertiary amino groups was determined to contain 0.127 moles of tertiary amino group, 0.139 moles of carboxyl group, and 0.385 moles of hydroxyl group per 1,000 grams of solid content thereof. Hereinafter, this emulsion polymer will be referred to as A-6.

Reference Example 7

[Preparation of a resin (anionic water soluble acrylic resin) for use as dispersion stabilizer]

Deionized water in the amount of 3,000 parts was added to a reaction vessel of the same type as employed in reference example 1, after which 20 parts of "LEVENOL WZ" (commercial name of sodium poly(oxyethylene) alkylphenyl ether sulfonic acid, manufactured by Kao Corp., solid content: 25%) was added. The emulsifying agent was then dissolved by raising the temperature to 80° C. as the mixture was stirred and nitrogen gas was introduced into the reaction vessel.

5 parts of ammonium persulfate was then added, after which a mixture consisting of 300 parts of methyl methacrylate, 549 parts of n-butyl acrylate, 150 parts of methacrylic acid, 1.0 parts of mono 2-methacryloxyethyl maleate, and 1.0 parts of n-dodecyl mercaptan was added dropwise over 3 hours, to carry out the polymerization reaction.

Following completion of the drop addition, the mixture was maintained at 80° C. for 1 hour while stirring was continued. Next, the contents of the vessel were cooled, after which deionized water was added so that the concentration of the solid content was 20.0%. The mixture was then filtered through a 100 mesh wire gauze.

The thus-obtained emulsion polymer had a solid content concentration of 20.0%, a pH of 2.3, and a viscosity of 10 cps. In addition, the aggregate which did not pass through the 100 mesh wire gauze was 0.1% or less (ratio relative to water dispersed solution). Hereinafter, this resin for use as a dispersive agent will be referred to as S-1.

Reference Example 8

[Preparation of a resin (anionic water soluble acrylic resin) for use as dispersion stabilizer]

Deionized water in the amount of 3,000 parts was added to a reaction vessel of the same type as employed in reference example 1, after which 20 parts of "LEVENOL WZ" (solid content: 5 parts) was added. The emulsifying agent was then dissolved by raising the temperature to 80° C. as the mixture was stirred and nitrogen gas was introduced into the reaction vessel.

5 parts of ammonium persulfate was then added, after which a mixture consisting of 300 parts of methyl methacrylate, 500 parts of n-butyl acrylate, 150 parts of methacrylic acid, 49 parts of 2-hydroxyethyl methacrylate, 1.0 parts of γ-methacryloyloxypropyl trimethoxy silane, 1.0 parts of n-dodecyl mercaptan was added dropwise over 3 hours, to carry out the polymerization reaction.

Following completion of the drop addition, the mixture was maintained at 80° C. for 1 hour while stirring was continued. Next, the contents of the vessel were cooled, after which deionized water was added so that the concentration of the solid content was 20.0%. The mixture was then filtered through a 100 mesh wire gauze.

The thus-obtained emulsion polymer had a solid content concentration of 20.0%, a pH of 2.4, and a viscosity of 10 cps. In addition, the aggregate which did not pass through the 100 mesh wire gauze was 0.1% or less (ratio relative to water dispersed solution). Hereinafter, this resin for use as a dispersive agent will be referred to as S-2.

Reference Example 9

[Preparation of a resin (anionic water soluble acrylic resin) for use as dispersion stabilizer]

660 parts of ethylene glycol monoisopropyl ether was placed in a reaction vessel of the same type employed in reference example 1. Next, as the monomer component, 50 parts of styrene, 100 parts of methyl methacrylate, 480 parts of n-butyl methacrylate, 150 parts of ethyl acrylate, 50 parts of 2-hydroxyethyl methacrylate, 20 parts of dimethylaminoethyl methacrylate, and 150 parts of methacrylic acid, and, as a radical polymerization initiator, 8 parts of azobis (isobutyronitrile) and 5 parts of tert-butylperoxy octoate (TBPO), were dropped in over a period of 4 hours.

On completion of this addition, the temperature was maintained for a further 10 hours. The targeted resin for use as a dispersion stabilizer which was obtained as a result had an average molecular weight of 9,500 with a non-volatile content of 60%. Heteafter this polymer will be referred to as S-3.

Reference Example 10

[Preparation of a resin (anionic water soluble acrylic resin) for use as dispersion stabilizer]

660 parts of ethylene glycol monoisopropyl ether was placed in a reaction vessel of the same type employed in reference example 1. Next, a mixture comprising 50 parts of styrene, 100 parts of methyl methacrylate, 480 parts of n-butyl methacrylate, 150 parts of ethyl acrylate, 50 parts of 2-hydroxyethyl methacrylate, 70 parts of γ-methacryloyloxypropylmethyldimethoxysilane, 150 parts of methacrylic acid, 8 parts of azobis(isobutyronitrile) and 5 parts of TBPO, was added dropwise over four hours.

On completion of this addition, the temperature was maintained for a further 10 hours. The targeted resin for use as a dispersion stabilizer which was obtained as a result had an average molecular weight of 10,500 with a non-volatile content of 60%. Hereafter this polymer will be referred to as S-4.

Reference Example 11

[Preparation of emulsion polymer (A) containing tertiary amino groups]

Deionized water in the amount of 400 parts and resin (S-1) obtained in reference example 7 for use as a dispersion stabilizer in the amount of 1,000 parts (solid content: 200 parts) were placed in a reaction vessel of the same type as employed in reference example 1. Thereafter, a mixture comprising 12 parts of 28% ammonia water and 160 parts of deionized water was added over 1 hour. The pH was then adjusted to 6, and the temperature was raised to 80° C.

0.4 parts of ammonium persulfate was then added as stirring was continued. A mixture consisting of 80 parts of styrene, 281.5 parts of cyclohexyl methacrylate, 320 parts of 2-ethylhexyl methacrylate, 80 parts of ethylhexyl acrylate, 37.5 parts of N,N-dimethylaminoethyl methacrylate, and 1.0 parts of n-dodecyl mercaptan, was added dropwise over 3 hours, to carry out the polymerization reaction.

After completion of this addition, the temperature was maintained for 1 hour as stirring was continued.

The vessel contents were then cooled, after which deionized water was added so that the concentration of the solid content was 40.0%. The thus obtained emulsion polymer had a pH of 6.0 and a viscosity of 30 cps. The aggregate which did not pass through the 100 mesh wire gauze was 4%, (ratio relative to water dispersed solution).

This emulsion polymer containing tertiary amino groups was determined to contain 0.191 moles tertiary amino group and 0.358 moles carboxyl group per 1,000 grams of solid content thereof. Hereinafter, this emulsion polymer will be referred to as A-7.

Reference Example 12

[Preparation of emulsion polymer (A) containing tertiary amino groups]

Deionized water in the amount of 400 parts and resin (S-2) for use as a dispersion stabilizer obtained in reference example 8 in the amount of 1,000 parts (solid content: 200 parts) were placed in a reacLion vessel of the same type as employed in reference example 1. Thereafter, a mixture comprising 12 parts of 28% ammonia water and 160 parts of deionized water was added over 1 hour. The pH was then adjusted to 6, and the temperature was raised to 80° C.

0.4 parts of ammonium persulfate was then added as stirring was continued. A mixture consisting of 79 parts of styrene, 281.5 parts of cyclohexyl methacrylate, 320 parts of 2-ethylhexyl methacrylate, 80 parts of 2-ethylhexyl acrylate, 37.5 parts of N,N-dimethylaminoethyl methacrylate, 1.0 parts of γ-methacryloyl oxypropyltrimethoxysilane, and 1.0 parts of n-dodecyl mercaptan, were added dropwise over 3 hours, to carry out the polymerization reaction. After completion of this addition, the temperature was maintained for 1 hour as stirring was continued.

The vessel contents were then cooled, after which deionized water was added so that the concentration of the solid content was 40.0%. The thus obtained emulsion polymer had a pH of 6.0 and a viscosity of 60 cps. The aggregate which did not pass through the 100 mesh wire gauze was 4% (ratio relative to water dispersed solution).

This emulsion polymer containing tertiary amino groups was determined to contain 0.191 moles of tertiary amino group and 0.349 moles of carboxyl group per 1,000 grams of solid content thereof. Hereinafter, this emulsion polymer will be referred to as A-8.

Reference Example 13

[Preparation of emulsion polymer (A) containing tetiary amino groups]

Resin (S-3) for use as a dispersion stabilizer obtained in reference example 9 in the amount of 333.3 parts (solid content: 200 parts) was placed in a reaction vessel of the same type as employed in reference example 1. Triethylamine was then added in the amount of 35.2 parts, after which 1,031.5 parts of deionized water was added over 1 hour. The temperature was then raised to 80° C.

0.4 parts of ammonium persulfate was then added as stirring was continued. A mixture consisting of 79 parts of styrene, 281.5 parts of cyclohexyl methacrylate, 320 parts of 2-ethylhexyl methacrylate, 80 parts of 2-ethylhexyl acrylate, 37.5 parts of N,N-dimethylaminoethyl methacrylate, 1.0 parts of γ-methacryloyloxypropyltrimethoxysilane, and 1.0 parts of n-dodecyl mercaptan, was added dropwise over 3 hours, to carry out the polymerization reaction. After completion of this addition, the temperature was maintained for 1 hour as stirring was continued.

The vessel contents were then cooled, after which deionized water was added so that the concentration of the solid content was 40.0%. The mixture was then filtered through a 100 mesh wire gauze. The thus obtained emulsion polymer had a pH of 9.9 and a viscosity of 160 cps. The aggregate which did not pass through the 100 mesh wire gauze was 4% (ratio relative to water dispersed solution).

This emulsion polymer containing tertiary amino groups was determined to contain 0.264 moles of tertiary amino group and 0.349 moles carboxyl group per 1,000 grams of solid content thereof. Hereinafter, his emulsion polymer will be referred to as A-9.

Reference Example 14

[Preparation of emulsion polymer (A) containing tertiary amino groups]

Resin (S-4) for use as a dispersion stabilizer obtained in reference example 10 in the amount of 333.3 parts (solid content: 200 parts) was placed in a reaction vessel of the same type as employed in reference example 1. Triethylamine was then added in the amount of 35.2 parts, after which 1,031.5 parts of deionized water was added over 1 hour. The temperature was then raised to 80° C.

0.4 parts of ammonium persulfate was then added as stirring was continued. A mixture consisting of 79 parts of styrene, 281.5 parts of cyclohexyl methacrylate, 320 parts of 2-ethylhexyl methacrylate, 80 parts of 2-ethylhexyl acrylate, 37.5 parts of N,N-dimethylaminoethyl methacrylate, 1.0 parts of γ-methacryloyloxypropyltrimethoxysilane, and 1.0 parts of n-dodecyl mercaptan, was added dropwise over 3 hours, to carry out the polymerization reaction. After completion of this addition, the temperature was maintained for 1 hour as stirring was continued.

The vessel contents were then cooled, after which deionized water was added so that the concentration of the solid content was 40.0%. The mixture was then filtered through a 100 mesh wire gauze. The thus obtained emulsion polymer had a pH of 9.4 and a viscosity of 160 cps. The aggregate which did not pass through the 100 mesh wire gauze was 4% (ratio relative to water dispersed solution).

This emulsion polymer containing tertiary amino groups was determined to contain 0.238 moles of tertiary amino group and 0.349 moles of carboxyl group per 1,000 grams of solid content thereof. Hereinafter, this emulsion polymer will be referred to as A-10.

Reference Examiple 15

[Preparation of emulsion polymer (A) containing tertiary amino groups]

Deionized water in the amount of 1,500 parts was added to a reaction vessel of the same type as employed in reference example 1, after which 5 parts of "EMULGEN 950" was added as an emulsifying agent. The emulsifying agent was then dissolved by raising the temperature to 80° C. as the mixture was stirred and nitrogen gas was introduced into the reaction vessel.

5 parts of ammonium persulfate was then added, after which a mixture consisting of 440 parts of methyl methacrylate, 470 parts of n-butyl acrylate, 20 parts of acrylic acid, 20 parts of N,N-dimethyl aminoethyl methacrylate, 20 parts of "PME-200" (commercial name of a monomer containing polyether chains, manufactured by NOF Corp.), 20 parts of "ELEMINOL JS-2", 1.0 parts of n-dodecyl mercaptan, and 2 parts of 25% ammonia water, was added dropwise over 3 hours, to carry out the polymerization reaction.

Following completion of the drop addition, the mixture was maintained at 80° C. for 2 hours while stirring was continued. Next, the contents of the vessel were cooled, after which ammonia water was added to adjust the pH to in excess of 8. Deionized water was then added so that the concentration of the solid content was 40.0%, after which the mixture was filtered through a 100 mesh wire gauze.

The thus-obtained emulsion polymer has a solid content concentration of 40.0%, a pH of 8.1 and a viscosity of 80 cps. Further, the aggregate which did not pass through the 100 mesh wire gauze was 0.1% or less (ratio relative to water dispersed solution).

This emulsion polymer containing a tertiary amino group was determined to contain 0.127 moles of tertiary amino group and 0.278 moles of carboxyl group per 1,000 grams of solid content thereof. Hereinafter, this emulsion polymer will be referred to as A-11.

Reference Example 16

Preparation of Pigment Paste 200.8 parts of "TIPAQUE R-930" (commercial name of titanium oxide produced by Ishihara Sangyo Co., Ltd.), "OROTAN SG-1" (commercial name of a pigment disperser produced by the U.S. company Rohm & Haas Co.); 3.9 parts of a 10% water soluble solution of sodium tripolyphosphate, 1.8 parts of "NOIGEN EA-120" (commercial name of a poly(oxyethylene)nonylphenyl ether-based emulsifying agent produced by Dai-ichi Kogyo Seiyaku Co., Ltd.), 14.5 parts of ethylene glycol, 0.8 parts of "BESTSIDE FX" (commercial name of an anticorrosive agent produced by Dainippon Ink & Chemicals, Inc.), 0.6 parts of "SN DEFOAMER 121" (commercial name of a defoaming agent produced by SAN NOPCO LIMITED), 59.1 parts of deionized water, and 0.4 parts of 28%, ammonia water were mixed together and stirred sufficiently at room temperature using a disper. The thus-obtained paste will be referred to as "pigment paste" hereinafter.

Working Examples 1~13, and Comparative Example 1

A variety of white paints were prepared using conventional methods, at the proportions shown in Table 1.

Next, using a 6 mil applicator, each of the paints was applied to a steel panel which had already been painted with a primer, constituted of an oil-free alkyd resin and melamine resin, and then baked (i.e., prepainted panel); a slate panel; and a polypropylene panel; and then left to dry at room temperature for 7 days to obtain a fully cured coating film.

The coating film applied to the polypropylene panel was peeled from a substrate and its gelling coefficient was measured. Meanwhile, the coating film applied to the prepainted steel panel was evaluated for initial gloss value, pencil hardness, and resistance to solvents, acids, alkalis and yellowing due to heat, and was also evaluated for resistance to weathering and staining after exposure for a period of two years in the suburbs of Miyazaki city.

Further, an evaluation was made on tests of secondary adhesive properties of the coating applied to the slate. These results are shown in Table 1.

TABLE 1

| | Working example 1 | Working example 2 | Working example 3 | Working example 4 |
|---|---|---|---|---|
| PAINT COMPOSITION | | | | |
| A-1 | 100 | | | |
| A-2 | | 100 | | |
| A-3 | | | 100 | |
| A-4 | | | | 100 |
| Pigment paste | 30.8 | 30.8 | 30.8 | 30.8 |
| γ-GPTMS | 2.7 | 3.8 | 3.8 | 3.8 |
| DBTDL | 0.04 | 0.03 | 0.04 | 0.03 |
| NMP | 0.4 | 0.4 | 0.4 | 0.4 |
| TEXANOL | 0.4 | 0.4 | 0.4 | 0.4 |
| Paint name | CC01 | CC02 | CC03 | CC04 |
| PAINT SURFACE PROPERTIES | | | | |
| Paint name | CC01 | CC02 | CC03 | CC04 |
| Gelling coefficient (%) | 92 | 85 | 96 | 92 |
| Initial gloss (20° C.) | 80 | 74 | 85 | 80 |
| Pencil hardness | B | 2B | HB | HB |
| Gloss retention coefficient (%) | 65 | 72 | 67 | 76 |
| Solvent resistance | ◎ | Δ | ◎ | ◎ |
| Resistance to acidity | | GOOD | | |
| Resistance to alkalinity | | GOOD | | |
| Secondary adhesiveness | 70 | 100 | 30 | 100 |
| Resistance to yellowing due to heat (Δb) | 1.4 | 0.2 | 0.1 | 0.4 |

Notes to Table 1:
γ-GPTMS . . . abbreviation for γ-glycidoxypropyltrimethoxy silane
DBTDL . . . abbreviation for dibutyl tin dilaurate
NMP . . . abbreviation for N-methyl pyrollidone
TEXANOL . . . 2,2,4-trimethyl-1,3-pentane diol monoisobutyl ester
Gelling coefficient (%): This percentage is calculated by dividing the weight of the paint film after it has been separated from the material and then soaked in acetone for 24 hours and dried, by the weight of film prior to soaking in acetone, and then multiplying by 100.
Pencil hardness: This refers to the hardness of a "Mitsubishi Uni" pencil [brand name, produced by Mitsubishi Pencil Co., Ltd.] required to scratch the coating film.
Gloss retention coefficient (%): This percentage value is calculated by the prepared below. The higher this value, the greater the weather resistant properties of the coating film.
Gloss retention coefficient (%) = $G_1/G_0 \times 100$
(Where, in this prepared $G_1$ refers to the 60° gloss value (the percentage of 60° incident light reflected) after 1 year exposure to the elements, and $G_0$ refers to the initial 60° gloss value.)
Solvent resistance: A piece of felt soaked in methyl ethyl ketone was placed on a sample of the paint film and weighted down with a 500 g weight. The felt was then rubbed back and forth over the paint surface 100 times and a visual evaluation was made of the external appearance of the coating film. The evaluation standards used are as follows.
◎ no change
o slight scratches visible
Δ marked loss in surface gloss
X dissolution and loss of coating film
Resistance to acidity: A 5% aqueous solution of sulfuric acid was dropped on to the film for a period of 24 hours, and the film then washed with water, and its external appearance evaluated visually.
Resistance to alkalinity: A 5% aqueous solution of sodium hydroxide was dropped on to the film for a period of 24 hours, and the film then washed with water, and its external appearance evaluated visually.
Secondary adhesiveness: A sample of the paint film was soaked in warm water at 40° C. for a period of one week. Following soaking, a cross cut pattern, consisting of 11 horizontal and 11 vertical cuts at regular intervals, was made on the film's surface and a stripping test carried out using cellophane tape. This was then employed as one evaluation of water resistance.
Resistance to yellowing due to heat: A paint film, cured for 7 days at room temperature, was over baked at 80° C. for a period of one hour, at which point the yellowing of the film was measured. The value [b] refers to the difference between the measured value and that for yellowing prior to over baking.

TABLE 1-continued

| | Working example 5 | Working example 6 | Working example 7 | Working example 8 |
|---|---|---|---|---|
| PAINT COMPOSITION | | | | |
| A-4 | 100 | 100 | | |
| A-5 | | | 100 | |
| A-6 | | | | 100 |
| Pigment paste | 30.8 | 30.8 | 30.8 | 30.8 |
| UV absorption agent | 0.8 | 0.8 | 0.8 | 0.8 |
| γ-GPTMS | 2.5 | 3.8 | 3.8 | 3.8 |
| TSL | 2.0 | 2.0 | 2.0 | 2.0 |
| N-MP | 0.4 | 0.4 | 0.4 | 0.4 |
| TEXANOL | 0.4 | 0.4 | 0.4 | 0.4 |
| Paint name | CC05 | CC06 | CC07 | CC08 |
| PAINT SURFACE PROPERTIES | | | | |
| Paint name | CC05 | CC06 | CC07 | CC08 |
| Gelling coefficient (%) | 89 | 92 | 96 | 88 |
| Initial gloss 20° | 82 | 78 | 72 | 78 |
| Pencil hardness | 3B | H | F | 2B |
| Gloss retention coefficient (%) | 78 | 84 | 88 | 89 |
| Solvent resistance | Δ | ○ | ○ | ◎ |
| Resistance to acidity | | GOOD | | |
| Resistance to alkalinity | | GOOD | | |
| Secondary adhesiveness | 75 | 90 | 100 | 100 |
| Resistance to yellowing due to heat (Δb) | 0.1 | 0.1 | 0.1 | 0.1 |

Notes to Table 1:
UV absorption agent . . . mixture in a 1:1 weight ratio of "TINUBIN 123" and "TINUBIN 384", both manufactured by the Swiss company Ciba-Geigy Corp.
TSL . . . abbreviation for a 2:1 blended mixture of "TSL 8178" and "TSL 8122", both silicate compounds manufactured by Toshiba Silicone Co., Ltd.

| | Working example 9 | Working example 10 | Working example 11 | Working example 12 |
|---|---|---|---|---|
| PAINT COMPOSITION | | | | |
| A-7 | 100 | | | |
| A-8 | | 100 | | |
| A-9 | | | 100 | |
| A-10 | | | | 100 |
| Pigment paste | 30.8 | 30.8 | 30.8 | 30.8 |
| UV absorption agent | 0.8 | 0.8 | 0.8 | 0.8 |
| γ-GPTMS | 7.8 | 7.6 | | |
| γ-GPMDMS | | | 8.1 | 7.7 |
| DBTDL | 0.04 | | | |
| SH-6018 | 2.0 | 2.0 | 2.0 | 2.0 |
| Paint name | CC09 | CC10 | CC11 | CC12 |
| PAINT SURFACE PROPERTIES | | | | |
| Paint name | CC09 | CC10 | CC11 | CC12 |
| Gelling coefficient (%) | 95 | 94 | 94 | 90 |
| Initial gloss 20° | 72 | 78 | 82 | 78 |
| Pencil hardness | 2B | 2B | HB | B |
| Gloss retention coefficient (%) | 84 | 89 | 79 | 76 |
| Solvent resistance | ○ | ○ | ○ | ○ |

TABLE 1-continued

| | | | | |
|---|---|---|---|---|
| Resistance to acidity | | GOOD | | |
| Resistance to alkalinity | | GOOD | | |
| Secondary adhesiveness | 100 | 100 | 100 | 100 |
| Resistance to yellowing due to heat (Δb) | 0.3 | 0.3 | 0.1 | 0.1 |

Notes to Table 1
γ-GPMDMS . . . abbreviation for
γ-glycidoxypropylmethyldimethoxysilane.
SH-6018 . . . Abbreviation for "Toray Silicone SH-6018", a silicone compound produced by Toray Silicone Co., Ltd.

| | Working example 13 | Comparative example 1 |
|---|---|---|
| PAINT COMPOSITION | | |
| A-11 | 100 | |
| A-1 | | 100 |
| Pigment paste | 30.8 | 30.8 |
| γ-GPTMS | 3.8 | 0 |
| DBTDL | 0.04 | |
| NMP | 0.4 | 0.4 |
| TEXANOL | 0.4 | 0.4 |
| Paint name | CC13 | CC'01 |
| PAINT SURFACE PROPERTIES | | |
| Paint name | CC13 | CC'01 |
| Gelling coefficient (%) | 83 | 0 |
| Pencil hardness | 2B | 5B |
| Gloss retention coefficient (%) | 60 | 5.8 |
| Solvent resistance | Δ | X |
| Resistance to acidity | GOOD | Deterioration in gloss |
| Resistance to alkalinity | GOOD | Film break-up |
| Secondary adhesiveness | 70 | 0 |
| Resistance to yellowing due to heat (Δb) | 0.2 | 2.3 |

Reference Example 17

[Preparation of emulsion polymer (A) containing tertiary amino groups]

Deionized water in the amount of 1,500 parts was added to a reaction vessel of the same type as employed in reference example 1, after which 40 parts of "EMULGEN 950" was added. The emulsifying agent was then dissolved by raising the temperature to 80° C. as the mixture was stirred and nitrogen gas was introduced into the reaction vessel.

5 parts of azobis(amidinopropane dihydrochloride) was then added, after which a mixture consisting of 449 parts cyclohexyl methacrylate, 370 parts of 2-ethylhexyl methacrylate, 100 parts of 2-ethylhexyl acrylate, 10 parts of acrylic acid, 20 parts of N,N-dimethylaminoethyl methacrylate, 1.0 parts of γ-methacryloyloxypropyltrimethoxysilane, 5.0 parts of 2-hydroxyethyl methacrylate, and 1 part of n-dodecyl mercaptan was added dropwise over 3 hours, to carry out the polymerization reaction.

Following completion of the drop addition, the mixture was maintained at 80° C. for 2 hours while stirring was continued. Next, the contents of the vessel were cooled, after which ammonia water was added to adjust the pH to in excess of 8. Deionized water was then added so that the concentration of the solid content was 40.0%, after which the mixture was filtered through a 100 mesh wire gauze.

The thus-obtained emulsion polymer had a solid content concentration of 40.0%, a pH of 8.3, and a viscosity of 28 cps. In addition, the aggregate which did not pass through the 100 mesh wire gauze was 0.1% or less (ratio relative to water dispersed solution).

This emulsion polymer containing tertiary amino groups was determined to contain 0.127 moles of tertiary amino group, 0.139 moles of carboxyl group, and 0.385 moles of hydroxyl group per 1,000 grams of solid content thereof. Hereinafter, this emulsion polymer will be referred to as A-12.

Reference Example 18

[Preparation of a resin (anionic water soluble acrylic resin) for use as dispersion stabilizer]

Deionized water in the amount of 3,000 parts was added to a reaction vessel of the same type as employed in reference example 1, after which 20 parts (solid content: 5 parts) of "LEVENOL WZ" (commercial name of sodium poly(oxyethylene)alkylphenyl ether sulfonic acid, produced by Kao Corp.; solid content: 25%) was added as an emulsifying agent. The emulsifying agent was then dissolved by raising the temperature to 80° C. as the mixture was stirred and nitrogen gas was introduced into the reaction vessel.

5 parts of ammonium persulfate was then added, after which a mixture consisting of 305 parts of methyl methacrylate, 660 parts of n-butyl acrylate, 30 parts of methacrylic acid, 5 parts of mono 2-methacryloxy ethyl maleate, and 1.0 parts of n-dodecyl mercaptan was added dropwise over 3 hours, to carry out the polymerization reaction.

Following completion of the drop addition, the mixture was maintained at 80° C. for 1 hour while stirring, was continued. Next, the contents of the vessel were cooled, after which deionized water was added so that the concentration of the solid content was 20.0%. The mixture was then filtered through a 100 mesh wire gauze.

The thus-obtained emulsion polymer had a solid content concentration of 20.0%, a pH of 3.4, and a viscosity of 10 cps. In addition, the aggregate which did not pass through the 100 mesh wire gauze was 0.1% or less (ratio relative to water dispersed solution). Hereinafter, this resin for use as a dispersive agent will be referred to as S-5.

Reference Example 19

[Preparation of a resin (anionic water soluble acrylic resin) for use as dispersion stabilizer]

Deionized water in the amount of 3,000 parts was placed in a reaction vessel of the same type employed in reference example 1, after which 20 parts of "LEVENOL WZ" (solid content: 5 parts) was added as an emulsifying agent. Next, the emulsifying agent was melted by raising the temperature to 80° C. as the mixture was stirred and nitrogen gas was introduced into the reaction vessel.

Next, 5 parts of ammonium persulfate was added, followed by the drop addition over three hours of a monomer mixture consisting of 300 parts of methyl methacrylate, 600 parts of n-butyl acrylate, 50 parts of methacrylic acid, 49 parts of 2-hydroxy ethyl methacrylate, 1.0 part of γ-methacryloyloxypropyltrimethoxysilane, and 1.0 parts of n-dodecyl mercaptan.

Following completion of this addition, the mixture was maintained at 80° C. and stirred for one hour. Next, the contents of the vessel were cooled, after which deionized water was added so that the concentration of the solid content was 20.0%. The mixture was then filtered through a 100 mesh wire gauze.

The thus-obtained emulsion polymer had a solid content concentration of 20.0%, a pH of 3.2, and a viscosity of 10 cps. In addition, the aggregate which did not pass through the 100 mesh wire gauze was 0.1% or less (ratio relative to water dispersed solution). Hereinafter, this resin for use as a dispersive agent will be referred to as S-6.

Reference Example 20

[Preparation of a resin (anionic water soluble acrylic resin) for use as dispersion stabilizer]

660 parts of ethylene glycol monoisopropyl ether was placed in a reaction vessel of the same type as employed in reference example 1. Next, a mixture comprising 50 parts of styrene, 100 parts of methyl methacrylate, 480 parts of n-butyl methacrylate, 220 parts of ethyl acrylate, 50 parts of 2-hydroxyethyl methacrylate, 20 parts of dimethylaminoethyl methacrylate, and 80 parts of methacrylic acid, as the monomers, and 8 parts of azobis(isobutyronitrile) and 5 parts of tert-butylperoxy octoate (TBPO), as the radical polymerization initiators, was added dropwise over four hours.

On completion of this addition, the temperature was maintained for a further 10 hours. The targeted resin for use as a dispersion stabilizer which was obtained as a result had an number-average molecular weight of 9,500 with a non-volatile content of 60%. Hereinafter, this polymer will be referred to as S-7.

Reference Example 21

[Preparation of emulsion polymer (A)]

Deionized water in the amount of 400 parts and resin (S-5) obtained in reference example 18 for use as a dispersion stabilizer in the amount of 1,000 parts (solid content: 200 parts) were placed in a reaction vessel of the same type as employed in reference example 1. Thereafter, a mixture comprising 12 parts of 28% ammonia water and 160 parts deionized water was added over 1 hour. The pH was then adjusted to 6, and the temperature was raised to 80° C.

0.4 parts of ammonium persulfate was then added as stirring was continued. A mixture consisting of 80 parts of styrene, 281.5 parts of cyclohexyl methacrylate, 320 parts of 2-ethylhexyl methacrylate, 80 parts of 2-ethylhexyl acrylate, 37.5 parts of N,N-dimethylaminoethyl methacrylate, and 1.0 parts of n-dodecyl mercaptan, was added dropwise over 3 hours, to carry out the polymerization reaction. After completion of this addition, the temperature was maintained for 1 hour as stirring was continued.

The vessel contents were then cooled, after which deionized water was added so that the concentration of the solid content was 40.0%. The thus obtained emulsion polymer had a pH of 6.0 and a viscosity of 30 cps. The aggregate which did not pass through the 100 mesh wire gauze was 4% (ratio relative to water dispersed solution).

This emulsion polymer containing tertiary amino groups was determined to contain 0.191 moles of tertiary amino group and 0.358 moles of carboxyl group per 1,000 grams of solid content thereof. Hereinafter, this emulsion polymer will be referred to as A-13.

Reference Example 22

[Preparation of emulsion polymer (A)]

Deionized water in the amount of 400 parts and resin (S-6) obtained in reference example 19 for use as a dispersion stabilizer in the amount of 1,000 parts (solid content: 200 parts) were placed in a reaction vessel of the same type as employed in reference example 1. Thereafter, a mixture comprising 12 parts of 28% ammonia water and 160 parts of deionized water was added over 1 hour. The pH was then adjusted to 6, and the temperature was raised to 80° C.

0.4 parts of ammonium persulfate was then added as stirring was continued. A mixture consisting of 79 parts of styrene, 281.5 parts of cyclohexyl methacrylate, 320 parts of 2-ethylhexyl methacrylate, 80 parts 2-ethyl hexyl acrylate, 37.5 parts N,N-dimethyl aminoethyl methacrylate, 1.0 parts of γ-methacryloyloxypropyltrimethoxysilane and 1.0 parts of n-dodecyl mercaptan, was added dropwise over 3 hours, to carry out the polymerization reaction. After completion of this addition, the temperature was maintained for 1 hour as stirring was continued.

The vessel contents were then cooled, after which deionized water was added so that the concentration of the solid content was 40.0%. The thus obtained emulsion polymer had a pH of 6.0 and a viscosity of 60 cps. The aggregate which did not pass through the 100 mesh wire gauze was 4% (ratio relative to water dispersed solution).

This emulsion polymer was determined to contain 0.191 moles tertiary amino group and 0.349 moles of carboxyl group per 1,000 grams of solid content thereof. Hereinafter, this emulsion polymer will be referred to as A-14.

Reference Example 23

[Preparation of emulsion polymer (A)]

333.3parts (solidcontent: 200parts) of resin (S-7) obtained in reference example 20 for use as a dispersion stabilizer was placed in a reaction vessel of the same type as employed in reference example 1, after which 35.2 parts of triethyl amine was added. Next, deionized water in the amount of 1,031.5 parts was added over the course of one hour. The temperature was then raised to 80° C.

Next, as stirring was continued, 0.4 parts of ammonia persulfate was added to the mixture, followed by adding dropwise over three hours of a mixture comprising 79 parts of styrene, 281.5 parts of cyclohexyl methacrylate, 320 parts of 2-ethylhexyl methacrylate, 80 parts of 2-ethylhexyl acrylate, 37.5 parts of N,N-dimethylaminoethyl methacrylate, 1.0 parts of γ-methacryloyloxypropyltrimethoxysilane and 1.0 parts of n-dodecyl mercaptan, to carry out the polymerization reaction. Following completion of this addition, the mixture was maintained at 80° C. while stirring was continued.

The vessel contents were then cooled, after which deionized water was added so that the concentration of the solid content was 40.0%. The mixture was then filtered through a 100 mesh wire gauze. The thus obtained emulsion polymer had a solid concentration of 40.0%, a pH of 9.9 and a viscosity of 160 cps. The aggregate which did not pass through the 100 mesh wire gauze was 4% (ratio relative to water dispersed solution).

This emulsion polymer was determined to contain 0.264 moles of tertiary amino group and 0.349 moles of carboxyl group per 1,000 grams of solid content thereof. Hereinafter, this emulsion polymer will be referred to as A-15.

Reference Example 24

[Preparation of emulsion polymer (A)]

Deionized water in the amount of 1,500 parts was added to a reaction vessel of the same type as employed in reference example 1, after which 5 parts of "EMULGEN 950" was added. The emulsifying agent was then dissolved by raising the temperature to 80° C. as the mixture was stirred and nitrogen gas was introduced into the reaction vessel.

5 parts of ammonium persulfate was then added, after which a mixture consisting of 440 parts of methyl methacrylate, 470 parts of n-butyl acrylate, 20 parts of acrylic acid, 20 parts of N,N-dimethylaminoethyl methacrylate, 20 parts of "PME-200" (commercial name of a monomer containing polyether chains, manufactured by NOF Corp.), 20 parts of "ELEMINOL JS-2", 1.0 part of n-dodecyl mercaptan, and 2 parts of 25% ammonia water was added dropwise over 3 hours, to carry out the polymerization reaction.

Following completion of the drop addition, the mixture was maintained at 80° C. for 2 hours while stirring was continued. Next, the contents of the vessel were cooled, after which ammonia water was added to adjust the pH to in excess of 8. Deionized water was then added so that the concentration of the solid content was 40.0%, after which the mixture was filtered through a 100 mesh wire gauze.

The thus-obtained emulsion polymer had a solid content concentration of 40.0%, a pH of 8.1, and a viscosity of 80 cps. In addition, the aggregate which did not pass through the 100 mesh wire gauze was 0.1% or less (ratio relative to water dispersed solution).

This emulsion polymer was determined to contain tertiary amino group in the amount of 0.127 moles, and carboxyl group in the amount of 0.278 moles, per 1,000 grams of solid content thereof. Hereinafter, this emulsion polymer will be referred to as A-16.

Reference Example 25

[Preparation of emulsion polymer (A)]

Deionized water in the amount of 1,500 parts was added to a reaction vessel of the same type as employed in reference example 1, after which 1.0 parts of "EMULGEN 950" was added. The emulsifying agent was then dissolved by raising the temperature to 80° C. as the mixture was stirred and nitrogen gas was introduced into the reaction vessel.

1.0 parts of ammonium persulfate was then added, after which a mixture consisting of 170 parts of ethyl acrylate, 30 parts of methacrylic acid, 2 parts of mono 2-methacryloxyethyl maleate, and 3 parts of 28% ammonia water was added dropwise over 1 hour, to carry out the polymerization reaction.

Following completion of the drop addition, the mixture was maintained at 80° C. for 30 minutes while stirring was continued. Next, 3 parts ammonium persulfate was added, followed by the drop addition over three hours of a monomer mixture consisting of 50 parts styrene, 370 parts of methyl methacrylate, 348 parts of n-butyl acrylate, 30 parts of N,N-dimethylaminoethyl methacrylate, and 1.0 parts of n-dodecyl mercaptan.

After completion of this addition, the mixture was maintained at 80° C. for two hours while stirring was continued. Next, the contents of the vessel were cooled, after which ammonia water was added to adjust the pH to in excess of 8. Deionized water was then added so that the concentration of the solid content was 40.0%, after which the mixture was filtered through a 100 mesh wire gauze.

The thus-obtained emulsion polymer had a solid content concentration of 40.0%, a pH of 8.1, and a viscosity of 80 cps. In addition, the aggregate which did not pass through the 100 mesh wire gauze was 0.1% or less (ratio relative to water dispersed solution).

This emulsion polymer was determined to contain tertiary amino group in the amount of 0.191 moles, and carboxyl group in the amount of 0.349 moles, per 1,000 grams of solid content thereof. Hereinafter, this emulsion polymer will be referred to as A-17.

Reference Example 26

[Preparation of emulsion polymer (A)]

Deionized water in the amount of 1,500 parts was added to a reaction vessel of the same type as employed in reference example 1, after which 10 parts of "EMULGEN 950" was added. The emulsifying agent was then dissolved by raising the temperature to 80° C. as the mixture was stirred and nitrogen gas was introduced into the reaction vessel.

1 part of azobis(amidinopropane dihydrochloride) was then added, after which a monomer mixture consisting of 150 parts of n-butyl acrylate, 120 parts of methyl methacrylate, and 30 parts of N,N-dimethylaminoethyl methacrylate, and 20 parts of acetic acid, were added dropwise over 1 hour, to carry out the polymerization reaction.

Following completion of the drop addition, the mixture was maintained at 80° C. for 30 minutes while stirring was continued. Next, 3 parts of tert-butyl hydroperoxide and 1.5 parts of sodium prepared sulfoxylate dihydrate were added, followed by adding dropwise over three hours of a monomer mixture consisting of 240 parts of methyl methacrylate, 150 parts of tert-butyl methacrylate, 300 parts of n-butyl acrylate, 4 parts of glycidyl methacrylate, and 1 part of n-dodecyl mercaptan.

After completion of this addition, the mixture was maintained at 80° C. for two hours while stirring was continued. Next, the contents of the vessel were cooled, after which deionized water was added to adjust the concentration of the solid content to 40.0%. The mixture was then filtered through a 100 mesh wire gauze.

The thus-obtained emulsion polymer had a solid content concentration of 40.0%, a pH of 5.6, and a viscosity of 580 cps. In addition, the aggregate which did not pass through the 100 mesh wire gauze was 0.1% or less (ratio relative to water dispersed solution).

This emulsion polymer was determined to contain tertiary amino group in the amount of 0.191 moles per 1,000 grams of solid content thereof. Hereinafter, this emulsion polymer will be referred to as A-18.

Reference Example 27

[Preparation of vinyl polymer (I) containing acidic groups and/or tertiary amino groups]

660 parts of ethylene glycol monoisopropyl ether was placed in a reaction vessel equipped with a stirrer, thermometer, condenser and nitrogen inlet, and the temperature was raised to 80° C. under a nitrogen gas atmosphere.

Next, a mixture consisting of 100 parts of styrene, 200 parts of methyl methacrylate, 480 parts of n-butyl methacrylate, 70 parts of ethyl acrylate, 50 parts of 2-hydroxyethyl methacrylate, 100 parts of dimethylaminoethyl methacrylate, and 8 parts of azobis(isobutyronitrile) and 5 parts of tert-butylperoxy octoate (TBPO), was added dropwise over four hours, to carry out polymerization.

On completion of this addition, the temperature was maintained for a further 10 hours to obtain a solution of the targeted tertiary amino vinyl polymer (I) which had a number-average molecular weight of 9,500 with a non-volatile content of 60%. Hereinafter, this polymer will be referred to as (I-a).

Reference Example 28

[Preparation of water-based compound (C)]

2 parts of an 88% aqueous solution of formic acid was added to 100 parts polymer (I-a) obtained in reference example 27, with stirring continued. The neutralization rate in this case was 100%.

Next, 98 parts of water was added, with the mixture stirred until uniform. The targeted water-based compound obtained had a non-volatile component of 30%, with 0.637 moles of tertiary amino group contained in this water-based compound per 1,000 grams of solid content thereof. Hereinafter, this water-based compound will be referred to as (C-1).

Reference Example 29

[Preparation of vinyl polymer (I) containing acidic groups and/or tertiary amino groups]

With the exception that a mixture consisting of 50 parts of styrene, 250 parts of methyl methacrylate, 430 parts of n-butyl methacrylate, 150 parts of ethyl acrylate, 50 parts of 2-hydroxy ethyl acrylate, 40 parts of dimethylaminoethyl methacrylate, and 30 parts methacrylic acid, was employed for the monomer mixture, and 10 parts TBPO) was employed for the radical polymerization initiator, a solution of the targeted vinyl polymer (I) containing both tertiary amino groups and acidic groups was obtained in the same manner as in reference example 27. This vinyl polymer (I) had a number-average molecular weight of 8,000 with a non-volatile content of 60%. Hereinafter, this polymer will be referred to as (I-b).

Reference Example 30

[Preparation of water-based compound (C)]

0.8 parts of an 88% aqueous solution of formic acid was added to 100 parts polymer (I-b) obtained in reference example 29, with stirring continued.

Next, 49.2 parts water was added, with the mixture stirred until uniform. The targeted water-based compound obtained had a non-volatile content of 40%, with 0.255 moles of tertiary amino group and 0.349 moles of carboxylic acid group contained in this water-based compound per 1,000 grams of solid content thereof. Hereinafter, this water-based compound will be referred to as (C-2).

Reference Example 31

[Preparation of water-based compound (C)]

2.1 parts of triethyl amine was added to 100 parts of the vinyl polymer (I-b) obtained in reference example 29, with stirring continued. Thereafter, 47.9 parts of water was added, with the mixture then stirred until a uniform dispersion was obtained. The targeted water-based compound obtained had a non-volatile content of 40%.

The water-based compound contained 0.255 moles of tertiary amino group and 0.349 moles of carboxyl group per 1,000 grams of solid content thereof. Hereinafter, this water-based compound will be referred to as (C-3).

Reference Example 32

[Preparation of vinyl polymer (I) containing acidic groups and/or tertiary amino groups]

With the exception that 666 parts of ethylene glycol monoisopropyl ether was employed as the polymerization solvent, a mixture consisting of 150 parts of styrene, 500 parts of n-butyl methacrylate, 150 parts of ethyl acrylate, 100 parts of 2-hydroxy ethyl acrylate, and 100 parts of acrylic acid, was employed for the monomer mixture, and 10 parts of TBPO was employed for the radical polymerization initiator, a solution of the targeted vinyl polymer (III) containing acidic groups was obtained in the same manner as in reference example 1. This vinyl polymer (III) had a number-average molecular weight of 8,000 with a non-volatile content of 60%. Hereinafter, this polymer will be referred to as (I-c).

Reference Example 33

[Preparation of water-based compound (C)]

1.8 parts of N,N-dimethyloctyl amine and 2.2 parts of triethyl amine was added to 100 parts of polymer (I-c) obtained in reference example 32, with stirring carried out. Thereafter, 96 parts of water was added, with the mixture stirred to form a uniform dispersion. The targeted water-based compound obtained had a non-volatile component of 30%), with 1.389 moles of carboxyl group contained in this water-based compound per 1,000 grams of solid content thereof. Hereinafter, this water-based compound will be referred to as (C-4).

Working Examples 13 to 27 and Comparative Examples 2 to 6

A variety of white paints were prepared by mixing the various constituents in the ratios shown in Table 2. The paints were then diluted with deionized water to a value of 85 KU as measured with a stomer viscometer.

Next, using a 6 mil applicator, each of the paints was applied to a steel panel which had already been painted with a primer, constituted of an oil free alkyd resin and melamine resin, and then baked (i.e., a prepainted panel); a slate panel; and a polypropylene panel; and then left to dry at ambient temperature for 7 days to obtain a fully cured coating film.

The coating material was also applied to the prepainted panel using a sagging tester, immediately after which the panel was stood upright, and sag of wet film thickness was evaluated.

For each of the cured coatings, the film applied to the polypropylene sheet was peeled from the panel and its gelling coefficient was measured, while the coating film applied to the prepainted steel panel was evaluated for initial gloss, pencil hardrness and resistance to solvents, acids, alkalis, and yellowing due to heat, as well as for resistance to weathering after exposure for a period of two years, and resistance to staining after exposure for a period of one month, in the suburbs of Miyazaki city.

In addition, an evaluation was made of secondary adhesion tests conducted on the coating applied to the slate. A summary of these results is shown in Table 2.

TABLE 2

| | Working example 13 | Working example 14 | Working example 15 | Working example 16 |
|---|---|---|---|---|
| PAINT COMPOSITION | | | | |
| A-1 | 188 | | | |
| A-3 | | 188 | | |
| A-4 | | | 188 | |
| A-12 | | | | 188 |
| C-3 | 62.5 | 62.5 | 62.5 | 62.5 |
| R-930 | 53.8 | 53.8 | 53.8 | 53.8 |
| γ-GPTMS | 10.4 | 9.04 | 12.4 | 12.4 |
| DBTDL | 0.05 | 0.05 | 0.05 | 0.05 |
| NMP | 1.0 | 1.0 | 1.0 | 1.0 |
| TEXANOL | 1.0 | 1.0 | 1.0 | 1.0 |
| Paint name | CC13 | CC14 | CC15 | CC16 |
| PAINT SURFACE PROPTERTIES | | | | |
| Paint name | CC13 | CC14 | CC15 | CC16 |
| Gelling coefficient (%) | 92 | 94 | 84 | 97 |
| Initial gloss (20° C.) | 80 | 79 | 72 | 74 |
| Pencil hardness | B | B | HB | HB |
| Gloss retention coefficient (%) | 65 | 69 | 76 | 77 |
| Solvent resistance | ⊚ | ⊚ | Δ | ○ |
| Resistance to acidity | | GOOD | | |
| Resistance to alkalinity | | GOOD | | |
| Secondary adhesiveness | 70 | 60 | 80 | 90 |
| Resistance to yellowing due to heat (Δb) | 1.4 | 0.2 | 0.1 | 0.4 |
| Resistance to dirt shedding | ○ | ○ | ○ | ○ |
| Critical wet film thickness in sag resistance at vertical plane | | 329 μm or more | | |

Notes to Table 2:
R-930 . . . abbreviation for "TIPAQUE R-930", brand name of titanium oxide produced by Ishihara Sangyo Co., Ltd.
γ-GPTMS . . . abbreviation for γ-glycidoxypropyltrimethoxysilane
DBTDL . . . abbreviation for dibutyl tin dilaurate
NMP . . . abbreviation for N-methyl pyrrolidone
TEXANOL . . . 2,2,4-trimethyl-1,3-pentane diol-monoisobutyl ester
Gelling coefficient (%): This percentage is calculated by dividing the weight of the paint film after it has been peeled from the material and then soaked in acetone for 24 hours and dried, by the weight of film prior to soaking in acetone, and then multiplying by 100.
Pencil hardness: This refers to the hardness of a "Mitsubishi Uni" pencil [brand name, produced by Mitsubishi Pencils Co., Ltd.] required to scratch the coating film.
Gloss retention coefficient (%): This percentage value is calculated by the prepared below. The higher this value, the greater the weather resistant properties of the coating film.
Gloss retention coefficient (%) = $G_1/G_0 \times 100$
(Where, in this prepared $G_1$ refers to the 60° gloss value (the percentage of 60° incident light reflected) after 1 year exposure to the elements, and $G_0$ refers to the initial 60° gloss value.)
Solvent resistance: A piece of felt soaked in methyl ethyl ketone was placed on a sample of the paint film and weighted down with a 500 g weight. The felt was then rubbed back and forth over the paint surface 100 times and a visual evaluation was made of the external appearance of the coating film. The evaluation standards used are as follows.
⊚ no change
○ slight scratches visible
Δ marked loss in surface gloss
X dissolution and loss of coating film
Resistance to acidity: A 5% aqueous solution of sulfuric acid was dropped on to the film for a period of 24 hours, and the film then washed with water, and its external appearance evaluated visually.
Resistance to alkalinity: A 5% aqueous solution of sodium hydroxide was dropped on to the film for a period of 24 hours, and the film then washed with water, and its external appearance evaluated visually.
μm: Indicates from micrometers or microns.
Secondary adhesiveness: A sample of the paint film was soaked in warm water at 40° C. for a period of one week. Following soaking, a cross cut pattern, consisting of 11 horizontal and 11 vertical cuts at regular intervals, was made on the film's surface and a stripping test carried out using cellophane tape. This was then employed as one evaluation of water resistance.
Resistance to yellowing due to heat: A paint film, cured for 7 days at room temperature, was over baked at 80° C. for a period of one hour, at which point the yellowing of the film was measured. The value [b] refers to the difference between the measured value and that for yellowing prior to over baking. This has been indicated as [Δb].
Resistance to dirt shedding . . . A visual evaluation was made of staining to the film after exposure for one month during which rain was allowed to drop onto the film.
⊚ . . . almost no staining
○ . . . slight staining over the entire film, but could be wiped away with gauze dampened in water
Δ . . . striated staining observed, but could be wiped away with gauze dampened in water
X . . . marked striated staining, which could not be wiped away with gauze dampened in water TABLE 2-continued

| | Working example 17 | Working example 18 | Working example 19 |
|---|---|---|---|
| PAINT COMPOSITION | | | |
| A-13 | 188 | | |
| A-14 | | 188 | |
| A-15 | | | 188 |
| C-3 | 62.5 | | 62.5 |
| C-4 | | 83.3 | |
| R-930 | 53.8 | 53.8 | 53.8 |
| UV absorption agent | 2.0 | 2.0 | 2.0 |
| γ-GPTMS | 19.9 | 17.6 | 21.6 |
| TSL | 15.0 | 15.0 | 15.0 |
| NMP | 1.0 | 1.0 | 1.0 |
| TEXANOL | 1.0 | 1.0 | 1.0 |
| Paint name | CC17 | CC18 | CC19 |
| PAINT SURFACE PROPERTIES | | | |
| Paint name | CC17 | CC18 | CC19 |
| Gelling coefficient (%) | 88 | 96 | 94 |
| Initial gloss 20° | 72 | 79 | 78 |
| Pencil hardness | H | F | F |
| Gloss retention coefficient (%) | 87 | 89 | 80 |
| Solvent resistance | ○ | ○ | ○ |
| Resistance to acidity | | GOOD | |
| Resistance to alkalinity | | GOOD | |
| Secondary adhesiveness | 100 | 100 | 100 |
| Resistance to yellowing due to heat (Δb) | 0.1 | 0.1 | 0.1 |
| Resistance to dirt shedding | ⊚ | ⊚ | ⊚ |
| Critical wet film thickness in sag resistance test at vertical plane | | 329 μm or greater | |

Notes to Table 2:
Numbers in the table indicate parts by weight.
UV absorption agent . . . mixture in a 1:1 weight ratio of "TINUBIN 123" and "TINUBIN 384", both manufactured by the Swiss company Ciba-Geigy Corp.
TSL . . . abbreviation for a 2:1 blended mixture of "TSL 8178" and "TSL 8122", both silicate compounds manufactured by Toshiba Silicone Co., Ltd.

TABLE 2-continued

| | Working example 20 | Working example 21 | Working example 22 | Working example 23 |
|---|---|---|---|---|
| PAINT SURFACE PROPERTIES | | | | |
| A-16 | 188 | | | |
| A-17 | | 188 | | |
| A-18 | | | 188 | 188 |
| C-1 | | | 83.3 | |
| C-2 | | | | 62.5 |
| C-3 | 62.5 | 62.5 | | |
| UV absorbing agent | 2.0 | 2.0 | | |
| γ-GPTMS | | 13.1 | 7.15 | |
| γ-GPMDMS | 10.0 | | | 9.71 |
| DBTDL | 0.04 | | | |
| SH-6018 | 20.0 | 20.0 | 20.0 | 20.0 |
| Paint name | CC20 | CC21 | CC22 | CC23 |
| Gelling coefficient (%) | 97 | 96 | 94 | 94 |
| Initial gloss 20° | 72 | 74 | 72 | 70 |
| Pencil hardness | HB | F | H | F |
| Gloss retention coefficient (%) | 89 | 84 | 60 | 66 |
| Solvent resistance | ⊙ | ⊙ | ⊙ | ⊙ |
| Resistance to acidity | | | GOOD | |
| Resistance to alkalinity | | | GOOD | |
| Secondary adhesiveness | 100 | 100 | 100 | 100 |
| Resistance to yellowing due to heat (Δb) | 0.3 | 0.3 | 0.1 | 0.1 |
| Resistance to dirt shedding | ○ | ⊙ | ○ | ○ |
| Critical wet film thickness in sag resistance test at vertical plane | | | 329 μm or greater | |

Notes to Table 2:
Numbers in the table indicate parts by weight.
γ-GPMDMS . . . abbreviation for γ-glycidoxypropylmethyldimethoxysilane
SH-6018 . . . abbreviation for Toray Silicone "SH-6018", brand name of a silicone compound produced by Toray Silicone Co., Ltd.

| | Working example 24 | Comparative example 2 | Working example 3 | Working example 4 |
|---|---|---|---|---|
| PAINT COMPOSITION | | | | |
| A-3 | 100 | 100 | 188 | |
| C-3 | | | 62.5 | 250 |
| pigment disperser | 9.2 | 9.2 | | |
| R-930 | 21.6 | 21.6 | 53.8 | 53.8 |
| γ-GPTMS | 5.0 | 3.8 | | 14.3 |
| DBTDL | | 0.04 | | |
| NMP | 0.04 | 0.4 | 1.0 | 1.0 |
| TEXANOL | 0.4 | 0.4 | 1.0 | 1.0 |
| 10% TT-935 | 0.8 | | | |
| Paint name | CC24 | CC'2 | CC'3 | CC'4 |

Notes to Table 2:
The numbers in the table are parts by weight.
(10% "TT-935"): Resultant product when "PRIMAL TT-935", the brand name of an emulsion containing carboxylic acid groups manufactured by the U.S. company Rohm & Haas Co., is neutralized with triethyl amine until the pH is 8.2, and water is added to adjust the mixture so that the non-volatile content is 10%.

TABLE 2-continued

| | Working example 24 | Comparative example 2 | Comparative example 3 | Comparative example 4 |
|---|---|---|---|---|
| PAINT SURFACE PROPERTIES | | | | |
| Paint name | CC24 | CC'2 | CC'3 | CC'4 |
| Gelling coefficient (%) | 89 | 89 | 25 | 94 |
| Initial gloss 20° | 67 | 47 | 79 | 81 |
| Pencil hardness | 2B | 2B | 4B | HB |
| Gloss retention coefficient (%) | 62 | 72 | 3.8 | 3.8 |
| Solvent resistance | ⊙ | ⊙ | X | ⊙ |
| Resistance to acidity | GOOD | GOOD | blistering | GOOD |
| Resistance to alkalinity | GOOD | GOOD | loss of gloss and yellowing | GOOD |
| Secondary adhesiveness | 30 | 30 | 0 | 80 |
| Resistance to yellowing due to heat (Δb) | 0.2 | 0.2 | 0.7 | 0.1 |
| Critical wet film thickness in sag resistance test at vertical plane | 329 μm or more | 152 μm | 329 μm or more | 127 μm |

| | Working example 25 | Comparative example 5 | Working example 6 |
|---|---|---|---|
| PAINT COMPOSITION | | | |
| A-3 | 188 | 100 | |
| C-3 | 62.5 | | 250 |
| pigment disperser | | 9.2 | |
| aluminum paste | 27.2 | 10.7 | 27.2 |
| γ-GPTMS | 9.04 | 3.8 | 14.3 |
| DBTDL | | 0.04 | |
| NMP | 1.0 | 0.4 | 1.0 |
| TEXANOL | 1.0 | 0.4 | 1.0 |
| Paint name | CC25 | CC'5 | CC'6 |

Notes to Table 2:
Numbers in the table indicate parts by weight.

| | Working example 25 | Comparative example 5 | Comparative example 6 |
|---|---|---|---|
| PAINT SURFACE PROPERTIES | | | |
| Paint name | CC25 | CC'5 | CC'6 |
| Gelling coefficient (%) | 92 | 93 | 90 |
| Pencil hardness | F | 2B | F |
| Solvent resistance | ⊙ | ⊙ | ⊙ |
| Resistance to acidity | GOOD | | GOOD |
| Resistance to alkalinity | GOOD | | GOOD |
| Secondary adhesiveness | 70 | 30 | 80 |
| Resistance to yellowing due to heat (Δb) | 0.2 | 0.2 | 0.2 |
| Metallic-like degrees IV value | 200 | 185 | 130 |

Notes to Table 2
Metallic-like degrees . . . IV value measured using "ALCOPE LMR-100", measuring apparatus of metallic-like degrees of film manufactured by Kansai Paint Co., Ltd.

INDUSTRIAL APPLICABILITY

The present invention's curable resin composition for use in water-based coating materials which is obtained as above not only offers superior coating and curing properties, but also provides a cured coating which has excellent resistance to weathering, solvents, chemicals and water, even in the case where cured at ambient temperatures. Moreover, this composition contains little or no organic solvent as compared to conventional products, therefore presenting no problem to the environment and reducing energy consumption when employed in manufacturing and coating operations. Thus, this composition is highly beneficial.

Accordingly, the present invention's curable resin composition for use in water-based coating materials can be used in a wide range of applications including use in such areas as automobile paint finish repair, civil engineering, architectural and building projects, and general applications, as well as applications on a variety of materials such as glass, plastic products and metallic materials like aluminum, stainless steel, chrome plating, hard pan, tin plate, and the like.

We claim:

1. A curable resin composition for use in water-based coating materials consisting essentially of, in combination,:
   an emulsion polymer (A), containing tertiary amino groups, obtained by carrying out emulsion polymerization of a vinyl monomer containing a tertiary amino group with another copolymerizable vinyl monomer in a water-based medium, and a compound (B) containing an epoxy group and a hydrolyzable silyl group,
   wherein the emulsion polymer (A) is obtained by means of a soap-free polymerization method, and
   the emulsion polymer (A) is neutralized with an acidic compound at some point in the soap-free polymerization so that the ratio of the equivalent weight of the acidic compound to that of amino groups in said emulsion polymer (A) containing tertiary amino groups is 0.1 or more.

2. A curable resin composition for use in water-based coating materials comprising, in combination,:
   an emulsion polymer (A), containing tertiary amino groups, obtained by carrying out emulsion polymerization of a vinyl monomer containing a tertiary amino group with another copolymerizable vinyl monomer in a water-based medium;
   a water-based compound (C) obtained by adding a neutralizing agent to a vinyl polymer (I) containing acidic groups and/or tertiary amino groups so as to neutralize at least 10% of said acidic groups and/or said tertiary amino groups, and then dispersing or dissolving in water; and
   a compound (B) containing an epoxy group and a hydrolyzable silyl group.

3. A curable resin composition for use in water-based coating materials comprising, in combination,:
   an emulsion polymer (A), containing tertiary amino groups, obtained by carrying out emulsion polymerization of a vinyl monomer containing a tertiary amino group with another copolymerizable vinyl monomer in a water-based medium;
   a compound (B) containing an epoxy group and a hydrolyzable silyl group; and
   a compound (D), different from and in addition to compound (B), contains a hydrolyzable silyl group and/or silanol group.

4. A curable resin composition for use in water-based coating materials comprising, in combination,:
   an emulsion polymer (A), containing tertiary amino groups, obtained by carrying out emulsion polymerization of a vinyl monomer containing a tertiary amino group with another copolymerizable vinyl monomer in a water-based medium;
   a water-based compound (C) obtained by adding a neutralizing agent to a vinyl polymer (I) containing acidic groups and/or tertiary amino groups so as to neutralize at least 10% of said acidic groups and/or said tertiary amino groups, and then dispersing or dissolving in water;
   a compound (B) containing an epoxy group and a hydrolyzable silyl group; and
   a compound (D), different from and in addition to compound (B), contains a hydrolyzable silyl group and/or silanol group.

5. A curable resin composition for use in water-base coating materials consisting essentially of, in combination:
   an emulsion polymer (A), containing tertiary amino groups, obtained by carrying out emulsion polymerization of a vinyl monomer containing a tertiary amino group with another copolymerizable vinyl monomer in a water-based medium, and a compound (B) containing an epoxy group and a hydrolyzable silyl group,
   wherein the emulsion polymer (A) is obtained by means of a soap-free polymerization method, and
   the emulsion polymer (A) is neutralized with a basic compound at some point in the soap-free polymerization so that a ratio of an equivalent weight of the basic compound to that of acidic groups in said emulsion polymer (A) containing tertiary amino groups is 0.1 or more.

6. A curable resin composition for use in water-based coating materials according to one of claims 1 through 4 and 5, wherein the emulsion polymer (A) containing tertiary amino groups also contains carboxyl groups.

7. A curable resin composition for use in water-based coating materials according to one of claims 1 through 4 and 5, wherein the emulsion polymer (A) containing tertiary amino groups is prepared by employing at least a vinyl monomer containing a hydroxyl group as a monomer component thereof.

8. A curable resin composition for use in water-based coating materials according to one of claims 1 through 4 and 5, wherein the emulsion polymer (A) containing tertiary amino groups is prepared by employing at least a vinyl monomer containing a cycloalkyl group as a monomer component thereof.

9. A curable resin composition for use in water-based coating materials according to one of claims 1 through 4, wherein the emulsion polymer (A), containing tertiary amino groups, is obtained by means of a soap-free polymerization method using an effective amount of emulsifying agent whereby improved water resistance of the cured composition is achieved.

10. A curable resin composition for use in water-based coating materials according to one of claims 2 through 4, wherein an emulsion polymer (A) containing tertiary amino groups is neutralized with an acidic compound so that the ratio of the equivalent weight of the acidic compound to that of amino groups in said emulsion polymer (A) containing tertiary amino groups is 0.1 or more.

11. A curable resin composition for use in water-based coating materials according to one of claims 2 through 4, wherein the emulsion polymer (A) containing tertiary amino groups is neutralized with a basic compound so that a ratio of an equivalent weight of the basic compound to that of acidic groups in said emulsion polymer (A) containing tertiary amino groups is 0.1 or more.

12. A curable resin composition for use in water-based coating materials according to one of claims 1 through 4 and 5, wherein an emulsion polymer (A) containing tertiary amino groups is an acrylic polymer.

13. A curable resin composition for use in water-based coating materials according to one of claims 2 or 4, wherein the vinyl polymer (I) containing acidic groups and/or tertiary amino groups is prepared using at least a vinyl monomer containing a hydroxyl group as a starting component.

14. A curable resin composition for use in water-based coating materials according to one of claims 2 or 4, wherein the vinyl polymer (I) containing acidic groups and/or tertiary amino groups is prepared using at least a vinyl monomer containing a cycloalkyl group as a starting component.

15. A curable resin composition for use in water-based coating materials according to one of claims 2 or 4, wherein the vinyl polymer (I), containing acidic groups and/or tertiary amino groups, comprises, in combination, an acrylic polymer and a fluoro olefin polymer.

16. A curable resin composition for use in water-based coating materials according to one of claims 2 or 4, wherein the vinyl polymer (I), containing acidic groups and/or tertiary amino groups, is a member selected from the group consisting of an acrylic polymer and a fluoro olefin polymer.

* * * * *